(12) United States Patent
Wang et al.

(10) Patent No.: US 8,223,069 B2
(45) Date of Patent: Jul. 17, 2012

(54) NETWORK ASSISTED POSITIONING

(75) Inventors: Shu Wang, San Diego, CA (US); Sang G. Kim, San Diego, CA (US); Li-Hsiang Sun, San Diego, CA (US); Byung K. Yi, San Diego, CA (US); Jungwon Min, San Diego, CA (US)

(73) Assignee: LG Electronics Inc., Seoul (KR)

( * ) Notice: Subject to any disclaimer, the term of this patent is extended or adjusted under 35 U.S.C. 154(b) by 118 days.

(21) Appl. No.: 12/554,759

(22) Filed: Sep. 4, 2009

(65) Prior Publication Data

US 2010/0060514 A1 Mar. 11, 2010

Related U.S. Application Data

(60) Provisional application No. 61/094,856, filed on Sep. 5, 2008, provisional application No. 61/094,849, filed on Sep. 5, 2008.

(51) Int. Cl.
*G01S 19/06* (2010.01)
*G01S 19/46* (2010.01)
*G01S 19/09* (2010.01)
*G01S 19/25* (2010.01)
*G01S 19/28* (2010.01)

(52) U.S. Cl. ......... 342/357.43; 342/357.29; 342/357.46; 342/357.64; 342/357.67

(58) Field of Classification Search ............. 342/357.43, 342/357.46, 357.29, 357.64, 357.67, 357.1
See application file for complete search history.

(56) References Cited

U.S. PATENT DOCUMENTS

| | | | | | |
|---|---|---|---|---|---|
| 4,901,310 | A | * | 2/1990 | Ichiyoshi | 370/307 |
| 5,418,538 | A | * | 5/1995 | Lau | 342/357.75 |
| 5,430,711 | A | * | 7/1995 | Yamada et al. | 370/206 |
| 6,104,978 | A | * | 8/2000 | Harrison et al. | 701/207 |
| 6,188,351 | B1 | * | 2/2001 | Bloebaum | 342/357.42 |
| 6,429,811 | B1 | * | 8/2002 | Zhao et al. | 342/357.66 |
| 6,611,756 | B1 | * | 8/2003 | Chen et al. | 701/213 |
| 7,155,340 | B2 | * | 12/2006 | Churan | 701/213 |
| 7,747,257 | B2 | * | 6/2010 | Zhao et al. | 455/456.1 |
| 7,782,254 | B2 | * | 8/2010 | Pitt et al. | 342/357.67 |
| 7,817,086 | B2 | * | 10/2010 | Sugimoto | 342/357.25 |
| 7,825,855 | B1 | * | 11/2010 | Nicholson | 342/357.43 |
| 7,839,333 | B2 | * | 11/2010 | Chen | 342/357.67 |
| 2002/0086682 | A1 | * | 7/2002 | Naghian | 455/456 |

(Continued)

OTHER PUBLICATIONS

GPS Navstar Global Positioning System, "Global Positioning System Satellite Positioning Service Signal Specification", Jun. 2, 1995.*

*Primary Examiner* — Thomas H. Tarcza
*Assistant Examiner* — Frank J McGue
(74) *Attorney, Agent, or Firm* — Lee, Hong, Degerman, Kang & Waimey

(57) ABSTRACT

A method for acquiring positioning information includes receiving downlink data in a plurality of downlink slot frames, and receiving at a mobile terminal within one of the downlink slot frames, broadcasted global positioning system (GPS) orbital description data. The GPS orbital description data information relates to a first group of orbiting satellites within operable range of the base station (BS) providing the broadcasting of the GPS orbital description data. The method further includes performing GPS-based positioning for the mobile terminal based upon signaling received from a second group of a plurality of orbiting satellites in conjunction with the GPS orbital description data, such that at least one of the second group of the plurality of orbiting satellites is the same as some or all of the orbiting satellites of the first group.

5 Claims, 19 Drawing Sheets

U.S. PATENT DOCUMENTS

| | | |
|---|---|---|
| 2004/0162084 A1* | 8/2004 | Wang .................... 455/456.1 |
| 2004/0167708 A1* | 8/2004 | Jenkins et al. ............. 701/207 |
| 2005/0052318 A1* | 3/2005 | Jendbro et al. ............ 342/357.1 |
| 2005/0192027 A1 | 9/2005 | Kim et al. |
| 2006/0148491 A1 | 7/2006 | Hyun et al. |
| 2008/0026733 A1 | 1/2008 | Jaatinen |
| 2008/0036655 A1* | 2/2008 | Pitt et al. ................ 342/357.15 |
| 2010/0201569 A1* | 8/2010 | Lee et al. ................ 342/357.42 |
| 2010/0220008 A1* | 9/2010 | Conover et al. .......... 342/357.29 |
| 2010/0231448 A1* | 9/2010 | Harper .................... 342/357.67 |

* cited by examiner

NETWORK ASSISTED POSITIONING

CROSS-REFERENCE TO RELATED APPLICATIONS

Pursuant to 35 U.S.C. §119(e), this application claims the benefit of earlier filing date and right of priority to Provisional Application Nos. 61/094,849 and 61/094,856, filed on Sep. 5, 2008, the contents of which are incorporated by reference herein in their entirety.

FIELD OF THE INVENTION

The present invention relates to wireless communications, and in particular, to determining position location of a mobile terminal.

DESCRIPTION OF THE RELATED ART

The need for more efficient and reliable positioning services and techniques in wireless communication networks is continuously increasing, especially given the positioning requirements set forth by the FCC Enhanced 911 and European Union (EU) Location-Enhanced 112 systems. Under the FCC Enhanced 911 system, Phase I states that within six months of a request by a Public Safety Answer Point (PSAP), the carrier will provide PSAPs with the telephone number and the cell site location for a 911 call.

Phase II relates to the notion that within six months of a request by a PSAP, more precise location information, such as the latitude and longitude of the caller, is to be provided. For network-based solutions, the standard for accuracy and reliability is on the order of 100 meters for 67% of calls and 300 meters for 95% of calls. For handset-assisted solutions, the standard for accuracy and reliability is on the order of 50 meters for 67% of calls and 150 meters for 95% of calls.

In 2000, the European Union (EU) launched activities for enhanced 112 (E-112) and the Coordination Group on Access to Location Information for Emergency Services (CGALIES) was initiated. An emergency management telecommunication (EMTEL) ad hoc group under the European Telecommunications Standards Institute (ETSI) Operational Co-ordination Group (OCG) was later set up to consider the standardization requirements. The EU further issued a recommendation for the Europe-wide implementation of the location-enhanced 112.

SUMMARY

In one aspect of the present invention, a method for acquiring positioning information includes receiving downlink data in a plurality of downlink slot frames; receiving at a mobile terminal within one of the downlink slot frames, broadcasted global positioning system (GPS) orbital description data, wherein the GPS orbital description data information relates to a first group of orbiting satellites within operable range of the base station (BS) providing the broadcasting of the GPS orbital description data; and performing GPS-based positioning for the mobile terminal based upon signaling received from a second group of a plurality of orbiting satellites in conjunction with the GPS orbital description data, wherein at least one of the second group of the plurality of orbiting satellites is the same as some or all of the orbiting satellites of the first group.

In another aspect of the present invention, a method for acquiring data to facilitate positioning includes receiving downlink data in a plurality of downlink slot frames; receiving at a mobile terminal within a portion of at least one slot frame of the downlink slot frames, a pilot signal broadcast from each of a plurality of base stations, wherein each of the pilot signals is received at a particular frequency and time within the portion of the at least one slot frame; and performing positioning for the mobile terminal based on the received pilot signals.

These and other embodiments will also become readily apparent to those skilled in the art from the following detailed description of the embodiments having reference to the attached figures, the present disclosure not being limited to any particular embodiment disclosed.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION OF PREFERRED EMBODIMENTS

Figure 1:
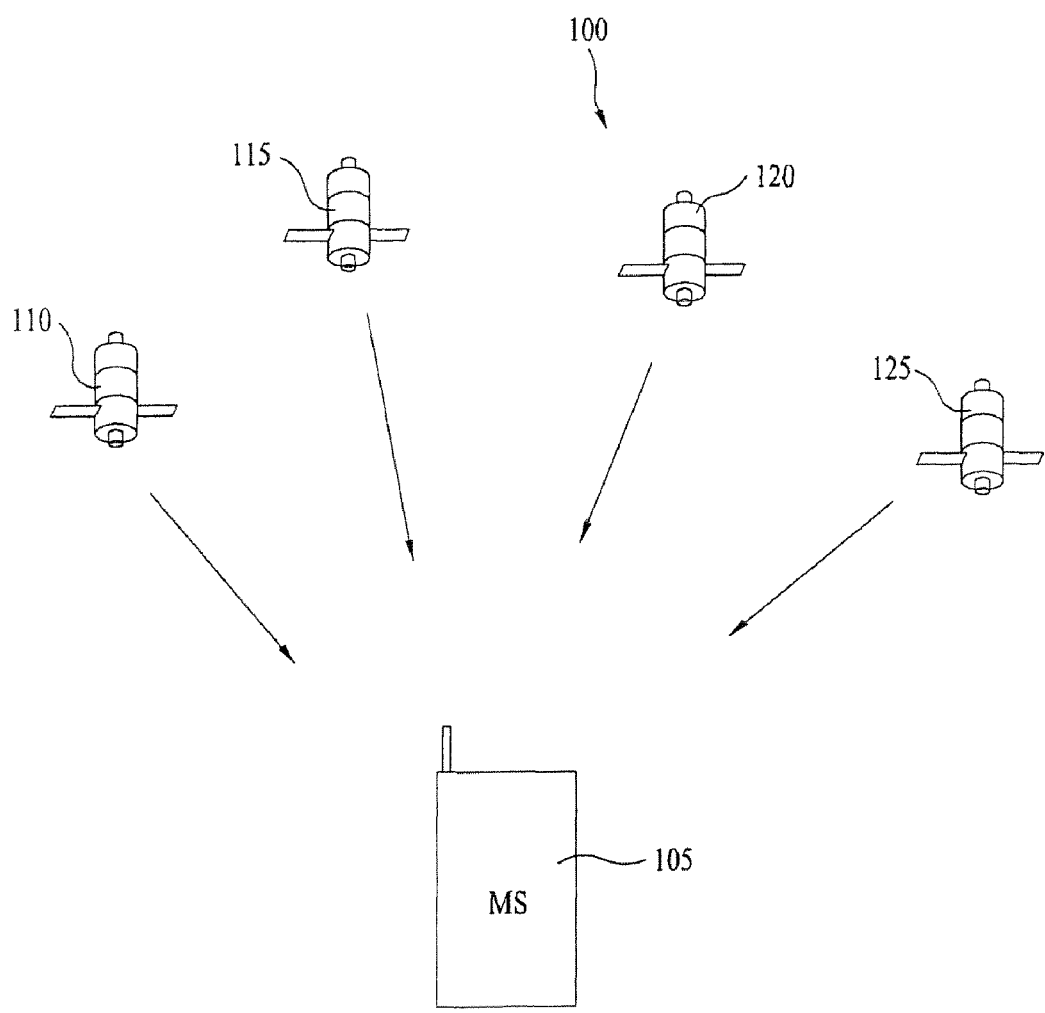
FIG. 1 depicts a GPS system having various satellites and providing signaling to a GPS receiver operating in conjunction with a mobile station.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Various embodiments will be presented herein in the context of a wireless communication network and associated entities configured in accordance with the IEEE 802.16 standards family commonly referred to as WiMAX. However, alternatives to such implementations are envisioned and teachings with regard to the WiMAX standard are generally applicable to other standards and air interfaces as well. Moreover, the use of certain terms to describe various embodiments should not limit such embodiments to a certain type of wireless communication system, such as WiMAX. Various embodiments are also applicable to other wireless communication systems using different air interfaces and/or physical layers including, for example, frequency division multiple access (FDMA), time division multiple access (TDMA), code division multiple access (CDMA), wideband CDMA (W-CDMA), and universal mobile telecommunications system (UMTS), the long term evolution (LTE) of the UMTS, and the global system for mobile communications (GSM). By way of non-limiting example only, further description will relate to a WiMAX communication system, but such teachings apply equally to other system types.

First of all, various embodiments may be used in cooperation of positioning techniques, such as those depicted in Table 1 set forth below. In particular, various positioning techniques include cell identification ("cell ID"), cell ID with timing advance (cell ID+TA), enhanced forward link trilateration ("EFLT"), angle of arrival ("AOA"), enhanced observed time difference ("EOTD"), advanced forward link trilateration ("AFLT"), uplink time difference of arrival ("U-TDOA"), global positioning system (GPS), and assisted GPS ("GPS/A-GPS"). Certain characteristics of such techniques are as follows.

TABLE 1

| | Attributes | Network | Handset | Accuracy |
|---|---|---|---|---|
| Cell ID | obtains Cell ID based on pilot measurements | All | All | 100 m-3 km. Depends on cell size and density |
| Cell ID + TA | combines Cell ID with time advance | GSM | All | Default is 500 m. Depends on bandwidth |
| EFLT | measures the forward link pilot timing | CDMA | All | 250-350 m |
| AOA | measures the angle of arrival by base stations | All | All | 100-200 m |
| EOTD | measures time difference by network and mobiles | GSM | upgrade | 50-200 m |
| AFLT | measures the forward link pilot timing | CDMA | upgrade | 50-200 m |
| U-TDOA | Network measures the timing difference | All | All | 50-100 m |
| GPS/A-GPS | utilize GPS receivers embedded in the handsets and network | All | upgrade | 5-30 m |

GPS is generally understood as a global navigation satellite system for determining the positions of a GPS receiver using signals broadcast by one or more satellites. Recently, the GPS implements 31 or so active broadcasting satellites in the GPS constellation. A-GPS with an assistance server was developed to enhance the positioning performance of a GPS receiver and to satisfy the FCC's E911 mandate.

In general, the assistance server can increase the capability of a stand-alone GPS receiver. For example, the assistance server can roughly locate a GPS receiver by itself, supply more GPS orbital data to the GPS receiver, and has better knowledge of atmosphere conditions and other errors, as well as better augmentation capability.

A-GPS with assistance server can be implemented to improve positioning in terms of location accuracy (e.g., positioning error), yield (e.g., positioning success rate), time to fix (e.g., time for positioning), battery consumption (e.g., power consumption for positioning), and mobile station (also referred to herein as a mobile terminal) device cost.

FIG. 1 depicts a GPS system 100 having various satellites and providing signaling to a GPS receiver operating in conjunction with a mobile station (MS). In particular, MS 105 is shown receiving signals from a plurality of GPS satellites 110-125. As described in more detail in conjunction with later figures, the MS typically includes a suitable antenna and receiver in order to receive and process signaling from the GPS satellites. The GPS receiver of the MS then performs operations such as initialization of positioning and timing, computes range, decodes the ephemeris data, computes GPS satellite positions, and computes the position of the MS.

Figure 2:
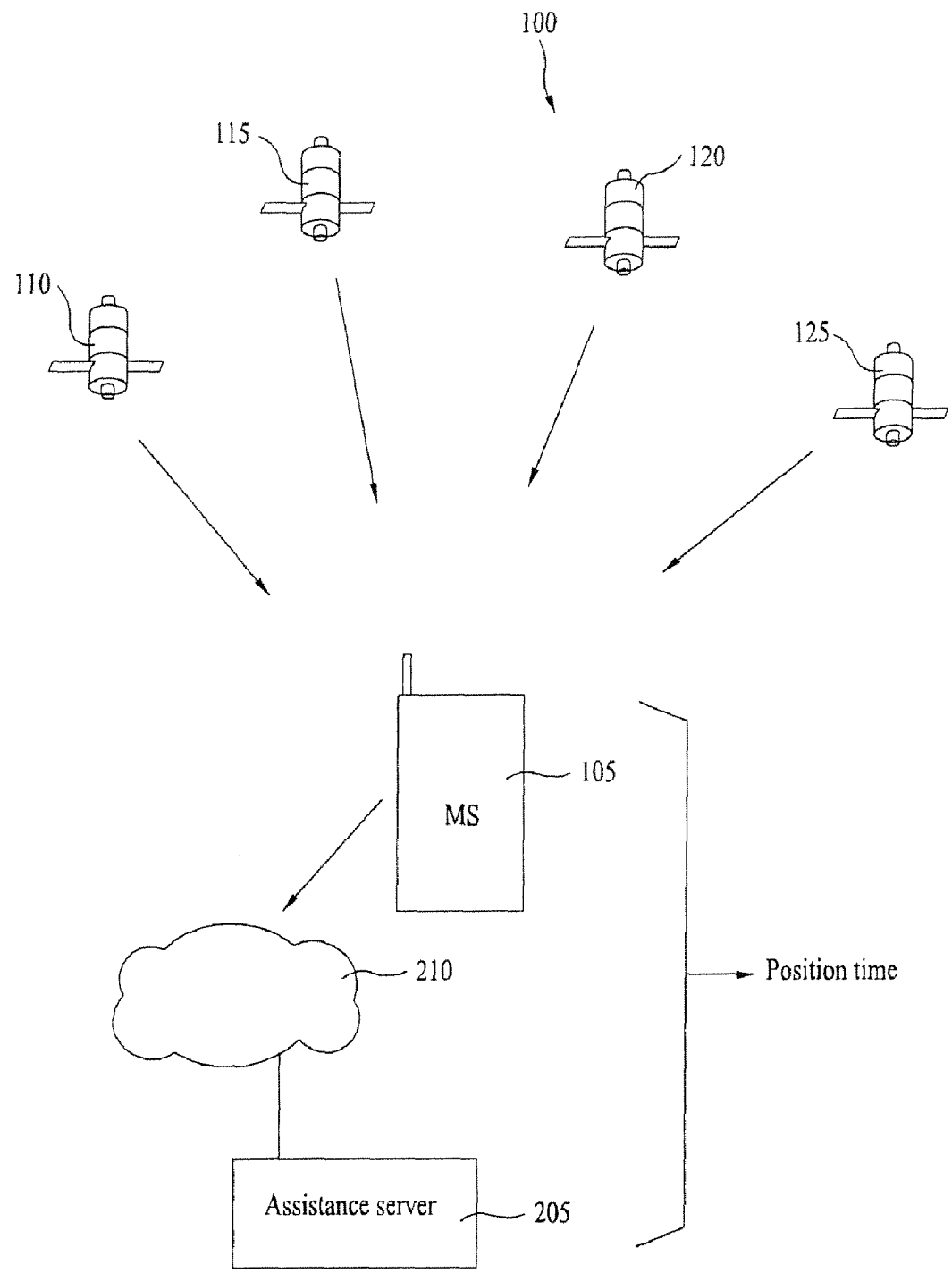
FIG. 2 depicts an A-GPS system having various satellites along with an assistance server to support positioning calculations.

FIG. 2 depicts an A-GPS system 200 having various satellites along with an assistance server to support positioning calculations. In this figure, MS 105 operates in conjunction with the depicted GPS satellites 110-125 similar to that just described. However, A-GPS system 200 implements assistance server 205 which may be configured to perform such things as initialization of positioning and timing, decoding the ephemeris data, and optionally computing the position of MS 105. Communication between MS 105 and assistance server 205 may be accomplished via network 210.

The GPS time type-length-value (TLV) shown in Table 2 below may be used to inform the receiving MS of the relatively precise time at which the base station's (BS) first frame of the current epoch has been transmitted, which the MS may use to calibrate its internal clock in reference to the GPS time standard. The GPS time TLV is typically used if the BS's frame time is synchronized with the GPS clock. This may be valuable for determining GPS satellite signal search windows in an MS equipped to detect GPS satellites, such as that depicted in FIG. 2.

With reference to Table 2, the GPS second and second fraction fields allow the MS to use downlink (DL) frame arrival times as timing signals aligned with GPS time. The GPS time accuracy field assists the MS in estimating the amount of error with respect to GPS time that the BS may have when using this calibration.

TABLE 2

| Field | Size | Description |
|---|---|---|
| GPS Second | 12 bits | GPS second, modulo 2048 |
| GPS Second fraction | 28 bits | GPS second fraction |
| GPS time accuracy | 8 bits | GPS Time Accuracy For unsigned integer values 0x00-0x3F: $\log_2$(Time error in pico seconds). For unknown accuracy in time error, 0xFF. Values 0x40-0xFE not allowed. |

The GPS frequency TLV shown below in Table 3 can be used to provide the frequency accuracy information including a BS transmit frequency accuracy in parts per million (ppm). For values in the range 0x00 to 0xFE, the frequency root mean square error is (value+1)×0.01 ppm. The value 0xff can be interpreted by the MS as maximum frequency accuracy uncertainty for that profile.

TABLE 3

| Name | Type | Length (bytes) | Value |
|---|---|---|---|
| Frequency information | 5 | 1 | BS transmit frequency accuracy in ppm. For values in range 0x00-0xFE, frequency root mean square error is (value + 1) * 0.01 ppm. For value 0xff, the MS shall interpret this as max frequency accuracy uncertainty for that profile, see subclause 12. |

Providing efficient and reliable positioning services in wireless communication networks includes challenges in view of drawbacks that may exist in both downlink and uplink approaches for determining the position of a MS within wireless communication networks. For example, uplink (UL) approaches typically impose a relatively lower burden on a MS since the network side generally has enough resources for performing positioning. Typically, UL approaches have low latency and do not require a feedback channel. Although UL approaches are flexible and can operate independent of standards, the typical transmit signal power of a MS is usually not strong.

Many downlink (DL) approaches require MSs to be explicitly involved in the positioning procedures. The DL approach, for example, is benefited by using the DL pilot channel which is generally very strong and consistent. In some cases, the DL pilot channel is used by the MS in the wireless communication network to perform positioning via time-difference of arrival (TDOA) techniques. In other DL approaches, the positioning feedback channel may be shared with other channels, which may delay positioning. Moreover, MSs have limited resources and knowledge.

In some DL approaches, the MS may be unable to detect the signals transmitted by various base transceiver stations (BTSs) in the wireless communication network to perform the TDOA techniques, and consequently, they are unable to accurately determine the desired position. As a result, where positioning using the DL approach is desired, network planning may be complex.

Figure 3:
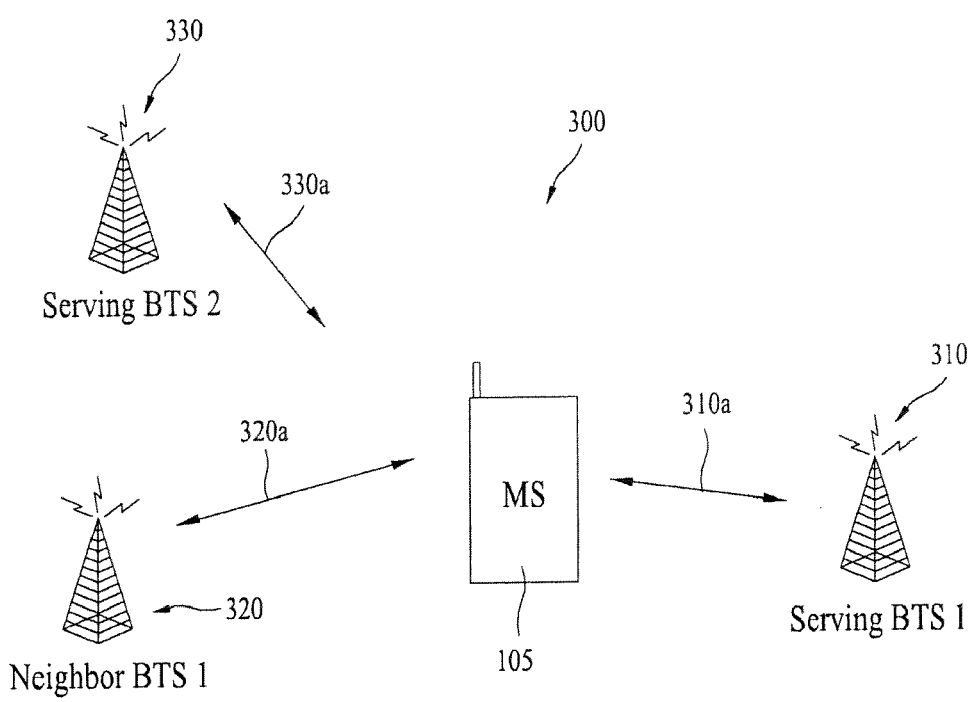
FIG. 3 shows wireless communication network configured to provide or permit various types of positioning techniques.

FIG. 3 shows wireless communication network 300 configured to provide or permit various types of positioning techniques. Signal 310a is shown transmitted from serving BTS 310 to mobile station (MS) 105. In some cases, the MS may be implemented as a mobile terminal, user equipment, subscriber station, and the like. In some situations, signaling from BTS 310 has the potential to interfere with or otherwise drown out signaling (e.g., pilot signals) provided by, for example, neighboring BTSs 320, 330. For instance, the example of FIG. 3 shows distant BTSs 320, 330 respectively transmitting signals 320a, 330a.

In general, serving BTS 310 may be configured to communicate with MSs located within operational range of the BTS. In this figure, BTS 310 is the serving BTS of MS 105. Signaling provided by the various serving and neighboring BTS are often in the form of multiple frames (e.g., orthogonal frequency-division multiple access (OFDMA) frames). Further examples of frames, timing, and other signaling features will be described in more detail in conjunction with later figures. For instance, the depicted system may be implemented as a N-GPS system 1400 in accordance with one embodiment of the present invention. It is further understood that network 300 may alternatively be implemented using multiple MSs 105, and with most any number of BTSs.

Figure 4:
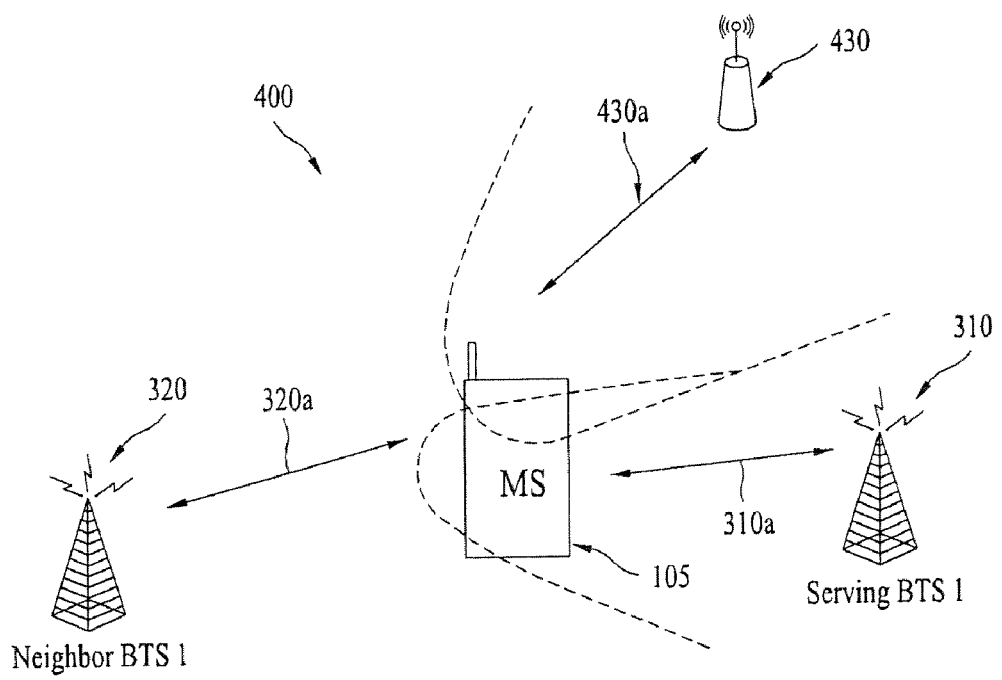
FIG. 4 shows a wireless communication network configured to provide or permit various types of positioning techniques.

FIG. 4 shows a wireless communication network 400 configured to provide or permit various types of positioning techniques. In this figure, BTS 310 is again the serving base station transmitting signal 310a to MS 105, which is shown located at a cell edge. MS 105 is also shown receiving signaling (e.g., pilot signals) from neighboring BTS 320 and location measurement unit (LMU) 430. In particular, BTS 320 and LMU 430 are shown transmitting signals 320a, 430a, respectively. Similar to the scenario described in FIG. 3, signaling from BTS 320 and the LMU may be interfered with or drowned out by signaling from serving BTS 310. Interference with the signaling from the neighboring stations (e.g., BTSs 320, LMU 430) increases as the network frequency reuse factor approaches a factor of one. One approach to minimize or eliminate such interface is to implement additional mechanisms for DL positioning.

Figure 5:
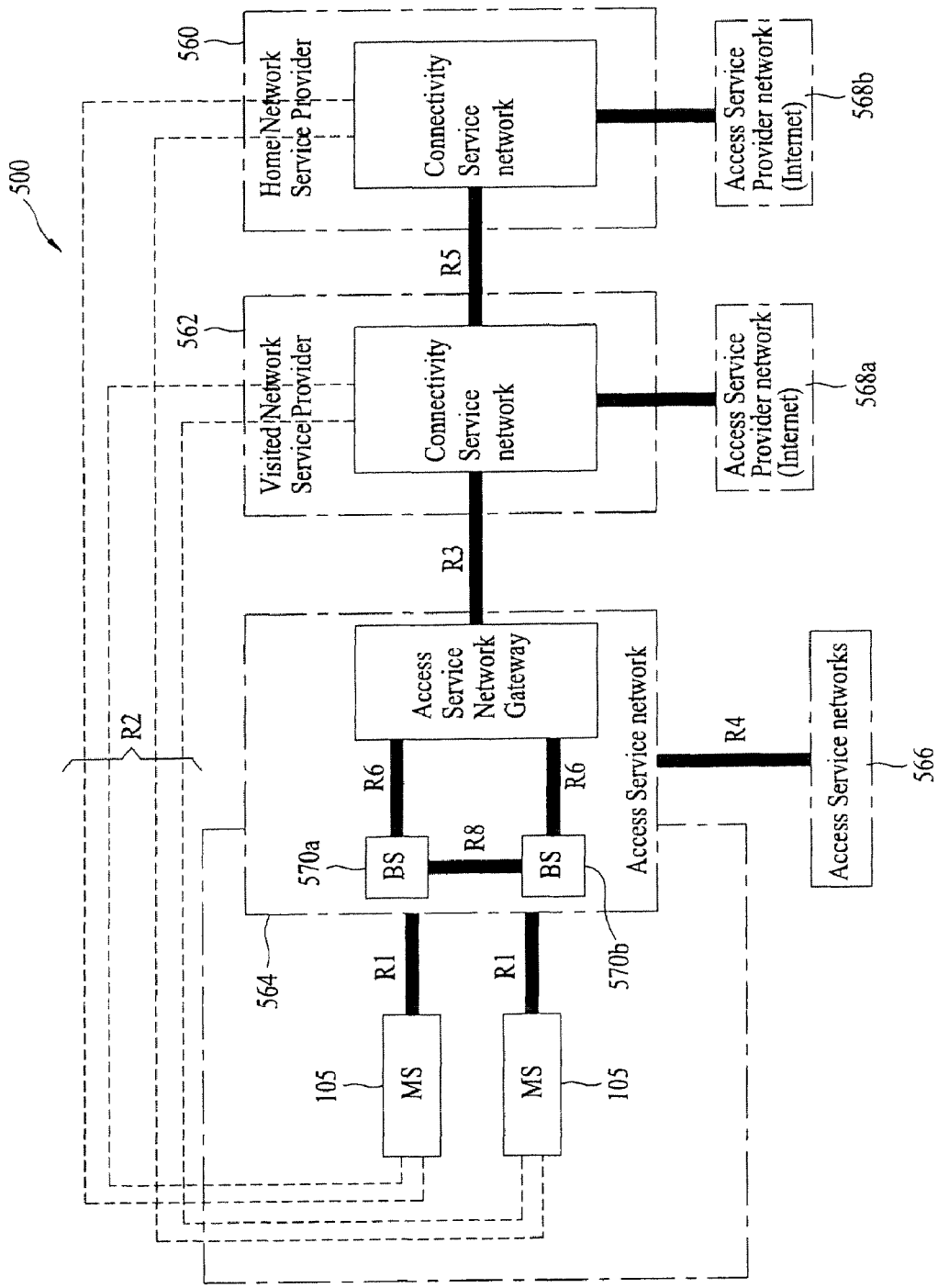
FIG. 5 is a block diagram of an exemplary communication network in accordance with various embodiments of the present invention.

FIG. 5 is a block diagram of an exemplary communication network in accordance with various embodiments of the present invention. In this figure, communication network 500 includes a home network service provider ("home NSP") 560, a visited network service provider ("visited NSP") 562, an access service network (ASN) 564, access service networks 566, access service provider networks 568a and 568b. MSs 105 are separately shown in communication with respective serving BSs 570a, 570b. In some embodiments, the BSs 570a, 570b, are implemented in a manner similar to that of the BTSs of FIGS. 3 and 4.

A network service provider, such as home NSP 560 or visited NSP 562, may include a business entity that provides IP connectivity and WiMAX services to WiMAX subscribers compliant with the service level agreement it establishes with WiMAX subscribers. A technique for providing these services includes the NSP establishing an agreement with one or more network access providers, which are commonly implemented as business entities providing WiMAX radio access infrastructure to one or more WiMAX network service providers.

ASN 564 typically includes a logical boundary and represents an aggregation of functional entities and corresponding message flows associated with the access services. ASN 564 often includes a boundary for functional interoperability with WiMAX clients, WiMAX connectivity service functions, and aggregation of functions embodied by different vendors, for example.

In FIG. 5, ASN 564 is shown sharing R1 reference point (RP) with MSs 105, R3 RP with a connectivity service network (CSN) of visited NSP 562, and a R4 RP with ASN 566. ASN 564 typically include one or more base stations and one or more instances of an ASN gateway (ASN-GW). The R4 reference point is typically implemented for control and bearer planes for interoperability between similar or heterogeneous ASNs. Interoperability between various types of ASNs may be accomplished using the specified protocols and primitives exposed across R1, R3 and R4 reference points.

In some embodiments, the depicted base stations are entities that embody a full instance of the WiMAX media access control (MAC) and physical (PHY) layers in compliance with the relevant transmission protocol. In the embodiment of FIG. 5, these base stations may be configured to function or otherwise implement the IEEE 802.16 suite of applicable standards, and may host one or more access functions. In some scenarios, the base stations each represent one sector with one frequency assignment and incorporates scheduler functions for both uplink and downlink resources.

Connectivity (e.g., reachability) of BSs 570a, 570b to more than one ASN-GW may be required or desired to facilitate load balancing, redundancy, and the like. Note that each BS 570a and/or 570b is a logical entity, and a physical implementation of such logical entities may implement one or more base stations.

Reference point R1 typically includes protocols and procedures to facilitate communication between MS 105 and ASN 564. If desired, reference point R1 may also include additional protocols related to the management plane.

Reference point R2 general includes protocols and procedures to facilitate communication between MS 105 and one or more CSNs. Reference point R2 is shown as a logical interface such that it does not reflect a direct protocol interface between a MS and the CSN.

The authentication part of reference point R2 is shown between MSs 105 and the CSN of home NSP 560. However the ASN and CSN of visited NSP 562 may partially or completely process the aforementioned procedures and mechanisms. Reference point R2 may also support IP host configuration management between the MSs 105 and the CSN (of either the home NSP 560 or the visited NSP 562).

Reference point R3 often includes a set of control plane protocols between ASN 564 and the CSN to support authentication, authorization, accounting (AAA), and the like, associated with a user (e.g., MS 105), and subscribed services across different access technologies. For example, AAA may include mechanisms for secure exchange and distribution of authentication credentials and session keys for data encryption.

Reference point R4 often includes a set of control and bearer plane protocols originating/terminating in various functional entities of an ASN that coordinate the mobility of MSs 105 between ASNs and ASN-GWs. In some scenarios, R4 is the only interoperable RP between similar or heterogeneous ASNs.

Reference point R5 may include a set of control plane and bearer plane protocols for internetworking between the CSN of the home NSP 560 and may be operated by the visited NSP 562.

The ASN gateway (ASN-GW) in ASN 564 is shown as a logical entity that represents an aggregation of control plane functional entities that are either paired with a corresponding function in the ASN (e.g., a BS instance), a resident function in the CSN, or a function in another ASN, such as ASN 566. The ASN-GW may also perform bearer plane routing or bridging function. ASN-GW implementation may include redundancy and load-balancing among several ASN-GWs.

In some embodiments, for each MS 105, a base station may be associated with only one default ASN GW. However, other embodiments permit ASN-GW functions for each MS to be distributed among multiple ASN-GWs located in one or more ASNs.

Reference point R6 generally includes a set of control and bearer plane protocols for communication between the BSs 570a and 570b and the ASN-GW. The bearer plane usually includes an intra-ASN data path between each of the BSs 570a and 570b and the ASN gateway. The control plane may include protocols for data path establishment, modification, and release control in accordance with the MS mobility events.

Reference point R7 may include an optional set of control plane protocols (e.g., for AAA and policy coordination in the ASN gateway), as well as other protocols for coordination between the various groups of functions identified in the reference point R6.

The decomposition of the ASN functions using the R7 protocols is optional. Reference point R8 may include a set of control plane message flows and optionally bearer plane data flows between BSs 570a and 570b to facilitate handover. The bearer plane often includes protocols that allow the data transfer between BSs involved in handover of a certain MS, such as MSs 105. The control plane may include an inter-BS communication protocol and additional set of protocols that allow controlling of the data transfer between the BSs involved in handover of a certain MS.

In some embodiments, communication network 500 may include relay stations to provide improved coverage and/or capacity by establishing Layer-3 (L3) connectivity with an MS configured to communicate using a desired protocol (e.g., IEEE 802.16e, IEEE 802.16m, and the like).

Figure 6:
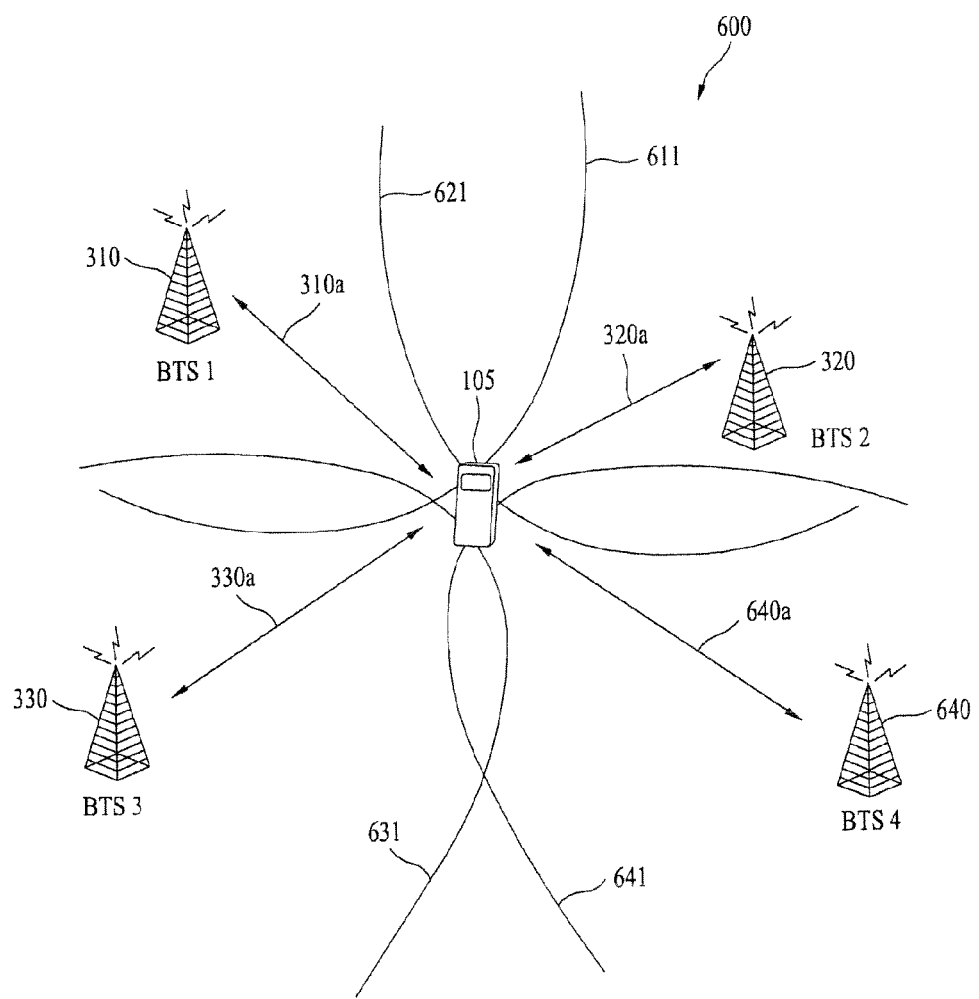
FIG. 6 depicts an exemplary wireless communication network in accordance with one embodiment of the present invention.

FIG. 6 depicts an exemplary wireless communication network 600 in accordance with one embodiment of the present invention. In this figure network 600 includes one or more MSs 105, a BTS 1 310, BTS 2 320, a BTS 3 330, and BTS 4 640. It is again noted that certain embodiments will be shown and described in the context of a WiMAX network. However, it should be understood that in other embodiments, a communication network, such as network 600 and others, can be implemented using different types of networks, and may also include greater or fewer number of entities (MSs, BTS, and the like).

BTS 1 310 is configured to transmit and receive data between MS 105 via a BTS 1 communication signal 310*a*, BTS 2 320 is configured to transmit and receive data between the MS via signal 320*a*, BTS 3 330 is configured to transmit and receive data between the MS via signal 330*a*, and BTS 4 640 is configured to transmit and receive data between the MS via signal 640*a*. In addition, the transmission ranges of BTS 1 310, 320, 330, 640 are indicated by the transmission ranges 611, 621, 631, and 641, respectively.

Signaling provided by the various BTS are often in the form of multiple frames (e.g., orthogonal frequency-division multiple access (OFDMA) frames). Further examples of frames, timing, and other signaling features will be described in more detail in conjunction with later figures. It is understood that network 600 may alternatively be implemented using multiple MSs 105, and with most any number of BTSs.

In accordance with many embodiments of the present invention, some or all of the BTSs in the previous figures may be configured to operate in accordance with the various transmission frames set forth in the following figures.

Figure 7:
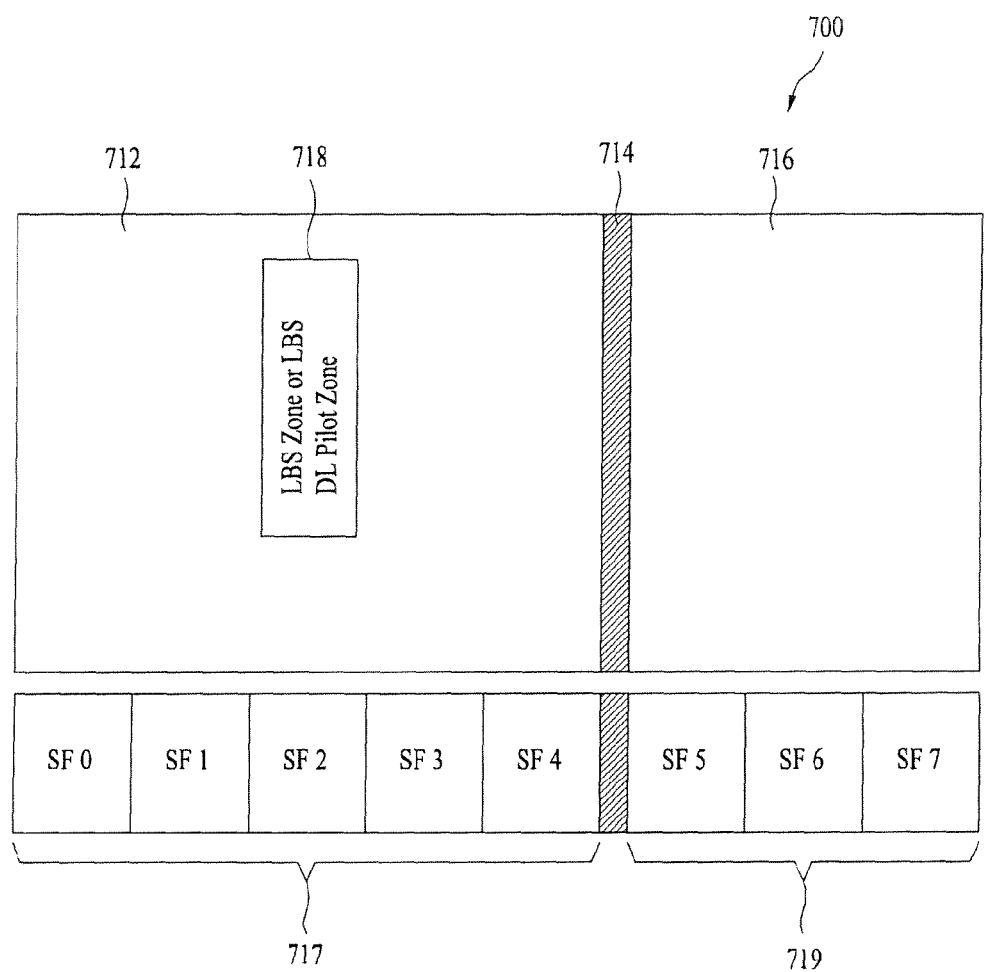
FIG. 7 depicts a BTS communication frame in accordance with various embodiments of the present invention.

FIG. 7 depicts a BTS communication frame in accordance with various embodiments of the present invention. BTS communication frame 700 includes a downlink (DL) zone 712, a guard zone 714, an uplink (UL) zone 716, slot frames 717 corresponding to the DL zone, and slot frames 719 corresponding to the UL zone 716. Frame 700 also includes a location based service (LBS) zone and/or LBS DL pilot zone 718 in the DL zone. The LBS zone and/or LBS DL pilot zone 718 represents an allocation of a time period and frequency resources for assisting the MS (e.g., MS 105) to perform positioning operations.

In general, the network reserves certain resources for transmitting LBS pilots during the LBS pilot zone. Each BTS can have its own LBS pilot waveform with a unique positioning code. The LBS pilots are typically implemented as orthogonally multiplexed and distinguished from each other with time, frequency position, and scrambling positioning codes.

Existing or future uplink ranging channel design can be reused for the LBS pilot design. In one embodiment, existing IEEE 802.16e ranging sequences can be reused. For example, the pseudo-random binary sequence (PRBS) generator can be initialized by the seed b14 to b0, which is equivalent to the sequence 0, 0, 1, 0, 1, 0, 1, 1, s0, s1, s2, s3, s4, s5, s6. For example, s6 is the LSB of the PRBS seed, and s6:s0=UL_PermBase, where s6 is the MSB of UL_PermBase.

The length of each ranging code may be, for example, 144 bits. The number of available codes is 256. For example, the first 144 bit code obtained by clocking the PN generator as specified with UL_PermBase=0 can be
  011110000011111 ... 00110000010001 ...

The next ranging code may be produced by taking the output of the 145th to the 288th clock of the PRBS generator, and the like. The bits may be mapped to the subcarriers in increasing frequency order of the subcarriers. The positioning of the LBS zone or LBS DL pilot zone 718 can be assigned in the same way as the MBS zone.

The LBS pilots transmitted during the LBS zone or LBS DL pilot zone 718 are generally a set of orthogonal pilots transmitted from the BTS to the MS for positioning purposes. Each of the involved BTS, also referred to herein simply as a BS, has its own unique LBS pilot, which is transmitted through a different set of symbol periods or frequency subcarriers from other LBS pilots. As such, collisions between any pair of LBS pilots can be avoided.

In one embodiment, the zone 718 can be allocated in the DL zone 712 independently by each BTS in the communication network 700. In another embodiment, one or more BTSs in this network can share the same LBS zone or LBS DL pilot zone.

Information corresponding to the position and size of zone 718 in the DL zone 712 can be provided to each of the MSs served by network 700. Zone 718 can be allocated dynamically or periodically.

Figure 8:
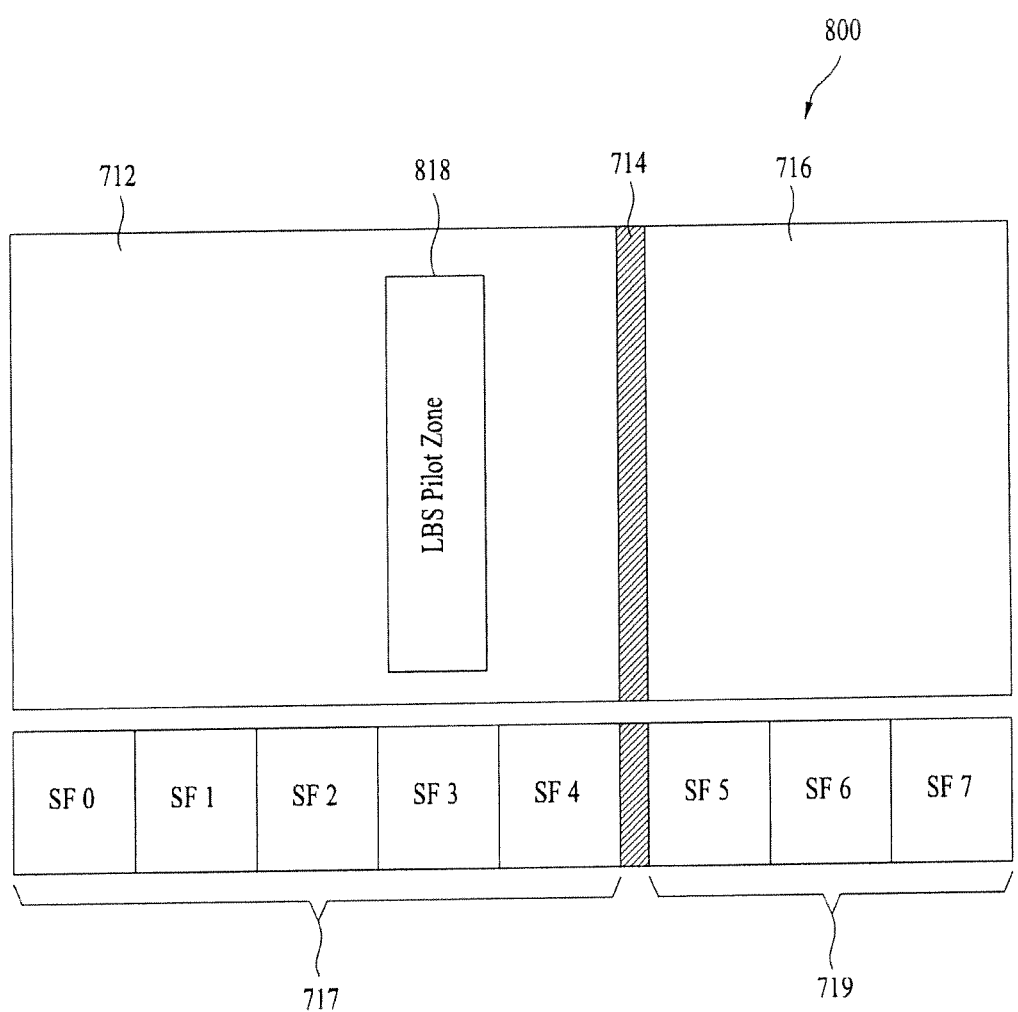
FIG. 8 depicts a BTS communication frame in accordance with alternative embodiments of the present invention.

FIG. 8 depicts a BTS communication frame in accordance with alternative embodiments of the present invention. Frame 800 is similar is many respects to frame 700 (FIG. 7). One difference relates to frame 800 including a LBS DL pilot zone 818 in DL zone 712. In this example, a single pilot signal is transmitted during the LBS DL pilot zone 818, and in particular, within slot frame ("SF") 3. If desired, zone 818 may alternatively or additionally be positioned within any other slot frame of the different slot frames in the DL zone 712.

Figure 9:
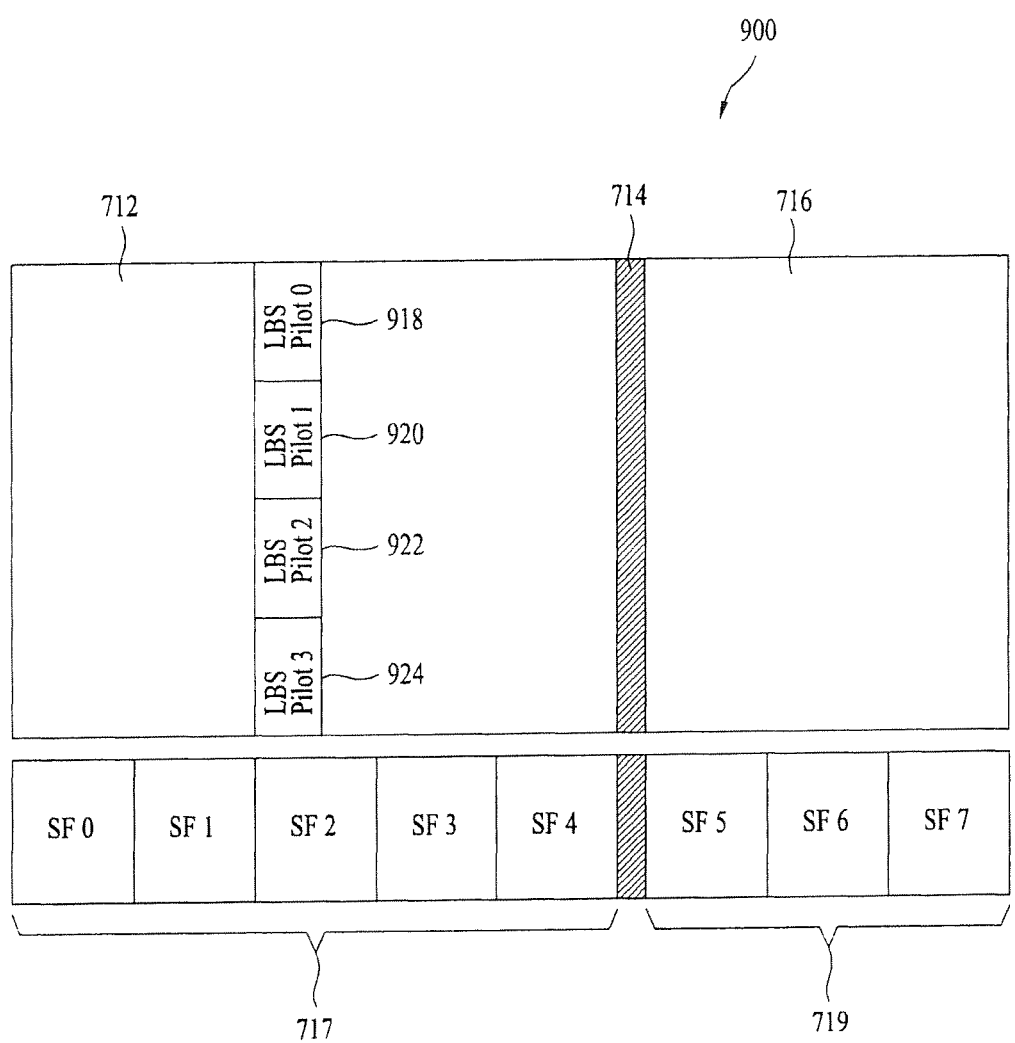
FIG. 9 depicts a BTS communication frame in accordance with another alternative embodiment of the present invention.

FIG. 9 depicts a BTS communication frame in accordance with another alternative embodiment of the present invention. In this figure, frame 900 includes multiple pilots occurring within a particular slot frame (e.g., any one or more of SF0-SF4). More specifically, LBS pilot 0 918, an LBS pilot 1 920, an LBS pilot 2 922, and an LBS pilot 3 924 are shown occurring within SF 2 of the DL zone 712. These pilots of SF 2 are typically transmitted as frequency division multiplexed pilot signals, such that each LBS pilot is transmitted over a substantially different frequency during a substantially same time period. One benefit of this arrangement is the preventing of collisions or interference of the various LBS pilot signals.

For example, as shown in FIG. 9, the LBS pilot 0 918, the LBS pilot 1 920, the LBS pilot 2 922, and the LBS pilot 3 924 are each transmitted within SF 2 during a substantially same time period. Although the LBS pilot 0 918, the LBS pilot 1 920, the LBS pilot 2 922, and the LBS pilot 3 924 are concurrently transmitted within SF 2, it should be understood that in other embodiments, the LBS pilot 0 918, the LBS pilot 1 920, the LBS pilot 2 922, and the LBS pilot 3 924 can be concurrently transmitted within a different slot frame in the DL zone 912.

Figure 10:
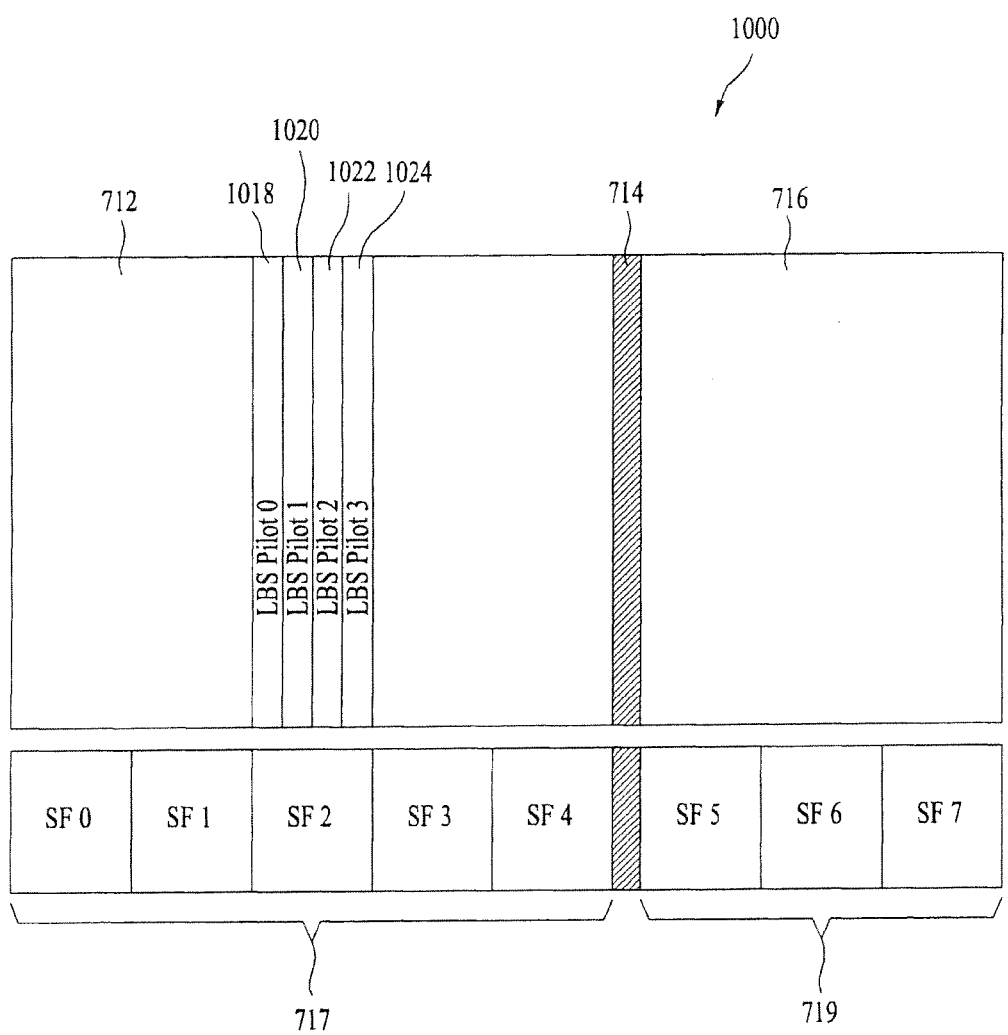
FIG. 10 depicts a BTS communication frame in accordance with another alternative embodiment of the present invention.

FIG. 10 depicts a BTS communication frame in accordance with another alternative embodiment of the present invention. In this figure, frame 1000 also includes multiple pilots occurring within a particular slot frame (e.g., any one or more of SF0-SF4). In particular, LBS pilot 0 1018, an LBS pilot 1 1020, an LBS pilot 2 1022, and an LBS pilot 3 1024 are show occurring within SF 2 of the DL zone 712. These pilots of SF 2 are typically transmitted as time division multiplexed pilot signals, such that each LBS pilot is transmitted over a substantially same frequency and over a substantially different time period. This arrange also serves to prevent collisions or interference of the LBS pilot signals.

For example, as shown in FIG. 10, the LBS pilot 0 1018, the LBS pilot 1 1020, the LBS pilot 2 1022, and the LBS pilot 3 1024 are each transmitted within SF 2 during a substantially different time period. Although these LBS pilots are transmitted within SF 2, it should be understood that in other embodiments, these pilots can be transmitted within a different slot frame in DL zone 712.

Figure 11:
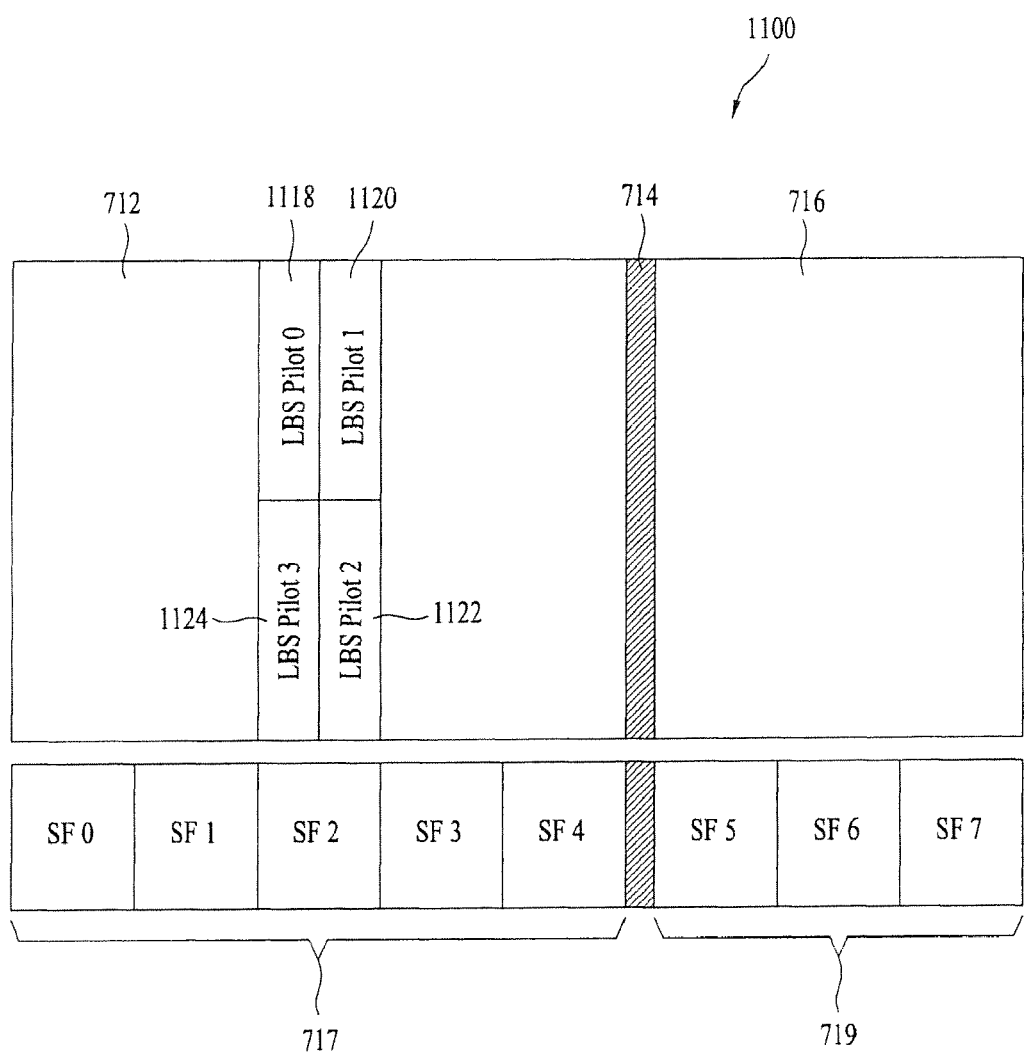
FIG. 11 depicts a BTS communication frame in accordance with another alternative embodiment of the present invention.

FIG. 11 depicts a BTS communication frame in accordance with another alternative embodiment of the present invention. In this figure, the LBS pilot 0 1118 and the LBS pilot 3 1124 are frequency division multiplexed pilot signals, such that each LBS pilot is transmitted over a substantially different frequency during a first substantially same time period during SF2 to prevent collisions or interference of the LBS pilot signals. In addition, the LBS pilot 1 1120 and the LBS pilot 2 1122 are frequency division multiplexed pilot signals, such that each LBS pilot is transmitted over a substantially different frequency during a second substantially same time period during SF 2 to prevent collisions or interference of the LBS pilot signals.

As further shown in FIG. 11, the LBS pilot 0 1118 and the LBS pilot 3 1124 are time division multiplexed with respect to the LBS pilot 1 1120 and the LBS pilot 2 1122, such that the first time period is generally or substantially different than the second time period. Note that the depicted pilots may be transmitted within any of the slot frames SF0-SF 4.

Figure 12:
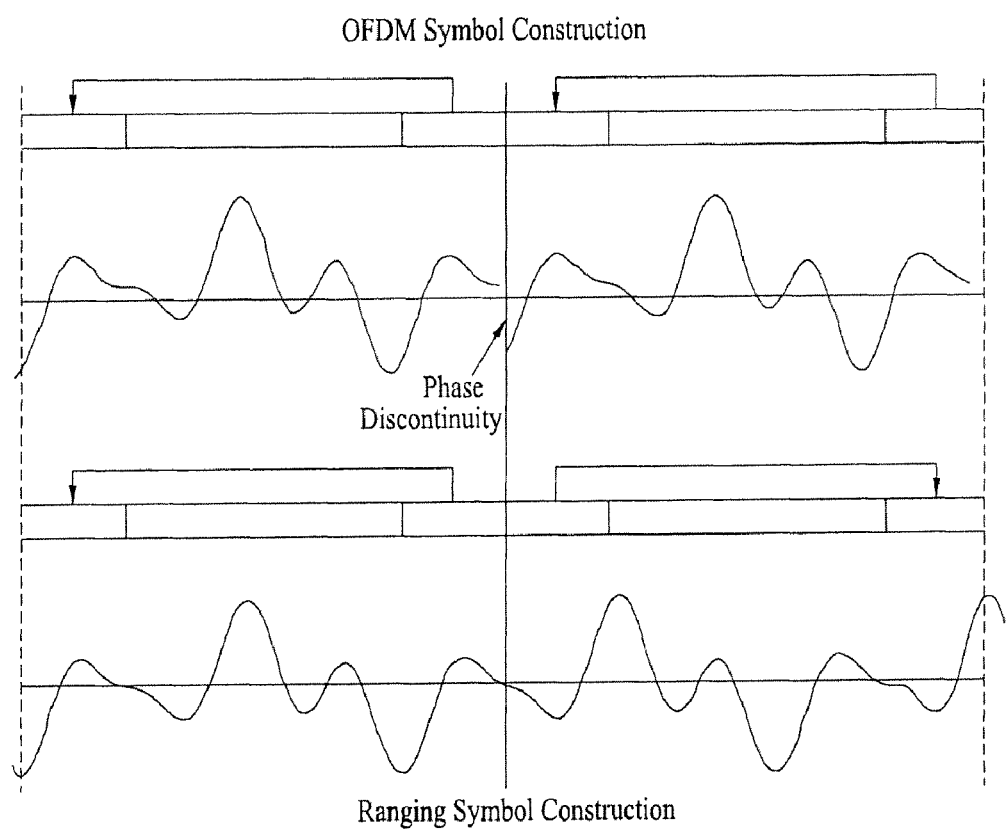
FIG. 12 shows a technique for constructing LBS pilot signals using orthogonal frequency-division multiplexing (OFDM) symbol construction.

The LBS pilot signals discussed herein can be designed using various techniques and methods. For example, LBS pilot signals can be designed using the orthogonal frequency-division multiplexing (OFDM) symbol construction and ranging symbol construction techniques shown in FIG. 12.

The initial ranging codes can be used for initial network entry and association. Handover ranging codes can be used for ranging against a target BTS during handover. An initial-ranging transmission can be performed during two or four consecutive symbols. The same ranging code is transmitted on the ranging channel during each symbol, with no phase discontinuity between the two symbols.

The position of the LBS pilots from each BTS is not required to be fixed in each corresponding communication frame. The LBS pilots can be configured to hop across different time or frequency resources to achieve diversity. On the other hand, a MS served by a communication network can identify and estimate the frame starting time for each BTS based on a hopping pattern or a scrambling sequence used in each LBS pilot.

Figure 13:
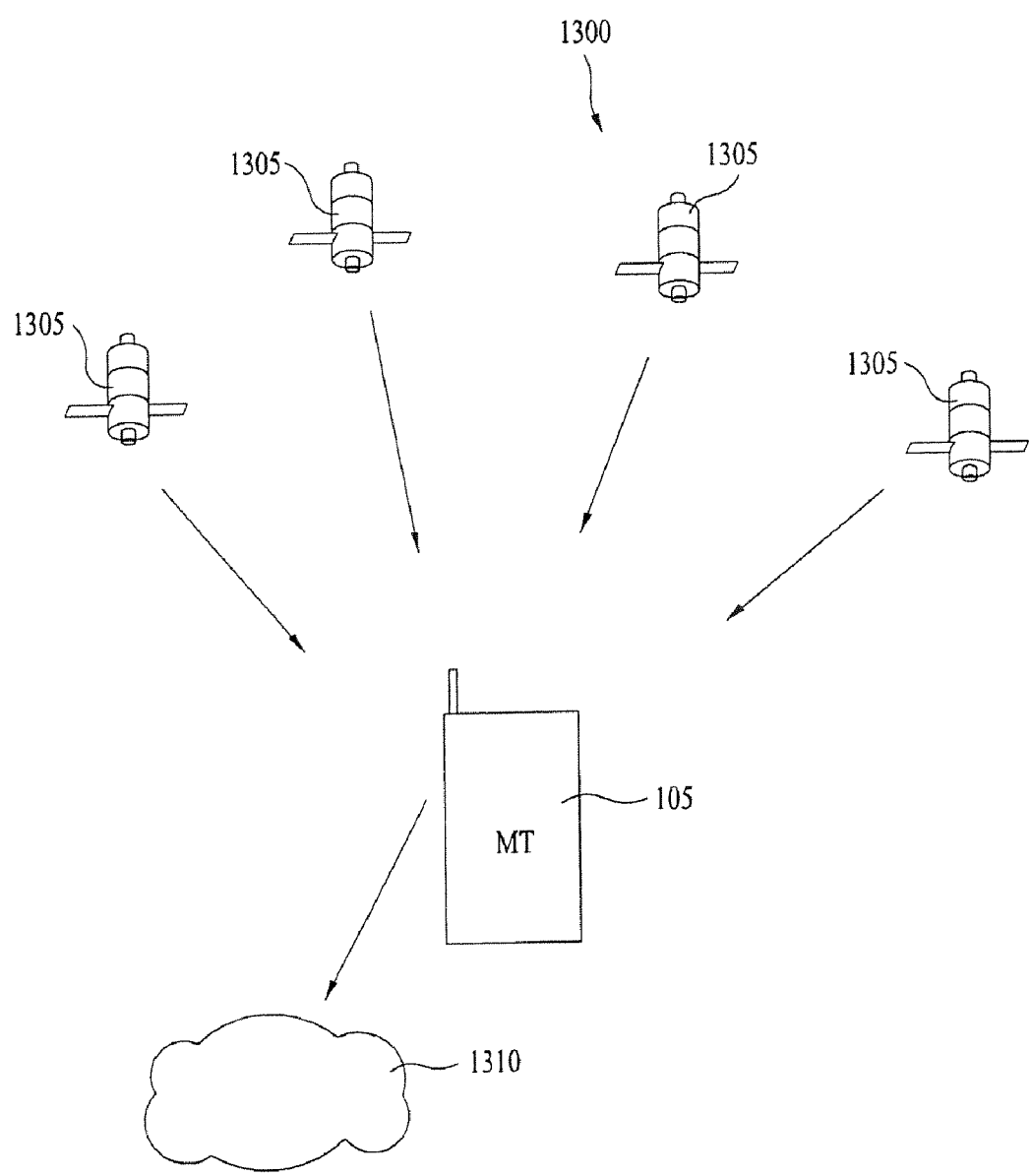
FIG. 13 shows a network assisted global positioning system ("N-GPS system") in accordance with an embodiment of the present invention.

FIG. 13 shows a network assisted global positioning system ("N-GPS system") 1300 in accordance with an embodiment of the present invention. In this figure the N-GPS system includes GPS satellites 1305, MS 105 (which in this embodiment includes an A-GPS receiver), which in turn is coupled to network 1310. Satellites 1305 may be configured in a manner similar to those set out in FIG. 1, for example.

In general, N-GPS system 1300 is a type of A-GPS system with network-based assistance, which further enhances the positioning performance of a GPS receiver, such as that which may be included in MS 105, and satisfies the FCC's E911 mandate as well as the requirements of various location based services.

In a typical A-GPS system, GPS assistance data is delivered to a MS mobile station via a traffic channel. The A-GPS system generally uses an IP-based user plan approach and relies on assistance from a third party server outside of a mobile network. The A-GPS system generally requires additional access control.

In the N-GPS system 1300, each BTS of network 1310 can provide assistance information to the served mobile stations through either a periodic broadcast or unicast. The assistance data is sent through a control plane instead of a user plane. The N-GPS system 1300 does not require data channel setup overhead and provides easy authentication or access control. The N-GPS system 1300 is generally more reliable than the layer-3 A-GPS system and is more efficient if a broadcast message is used for delivering assistance data.

Figure 14:
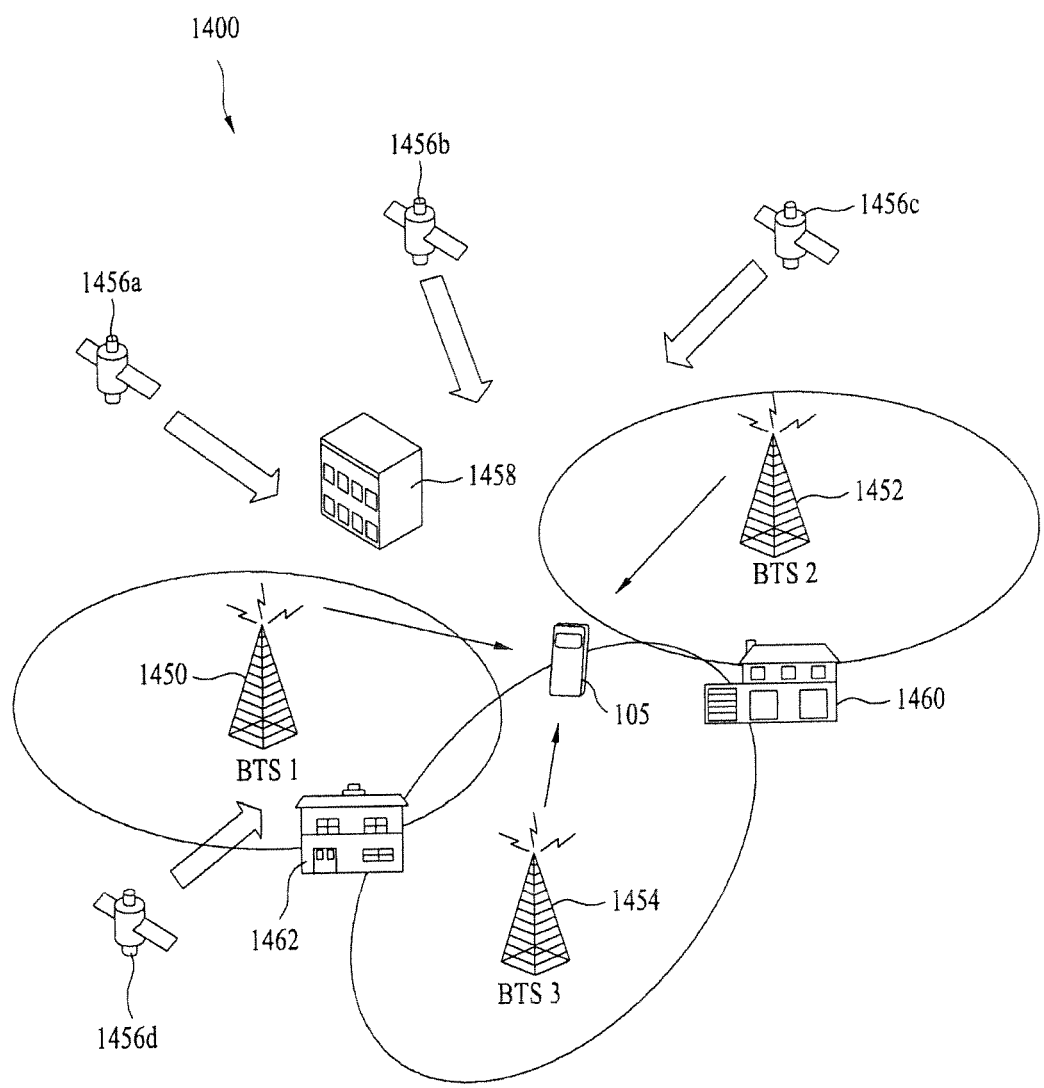
FIG. 14 shows an exemplary N-GPS system in accordance with one embodiment of the present invention.

FIG. 14 shows an exemplary N-GPS system 1400 in accordance with one embodiment of the present invention. The N-GPS system 1400 includes at least one MS 105, BTS 1 1450, BTS 2 1452, BTS 3 1454, GPS satellites 1456a, 1456b, 1456c, and 1456d, and structures 1458, 1460, and 1462.

In one embodiment, the various BTS, GPS satellites, and MS operate in a manner similar to that previously described. In the current example, such entities may be configured to communicate using the IEEE 802.16m WiMAX protocol.

Figure 15:
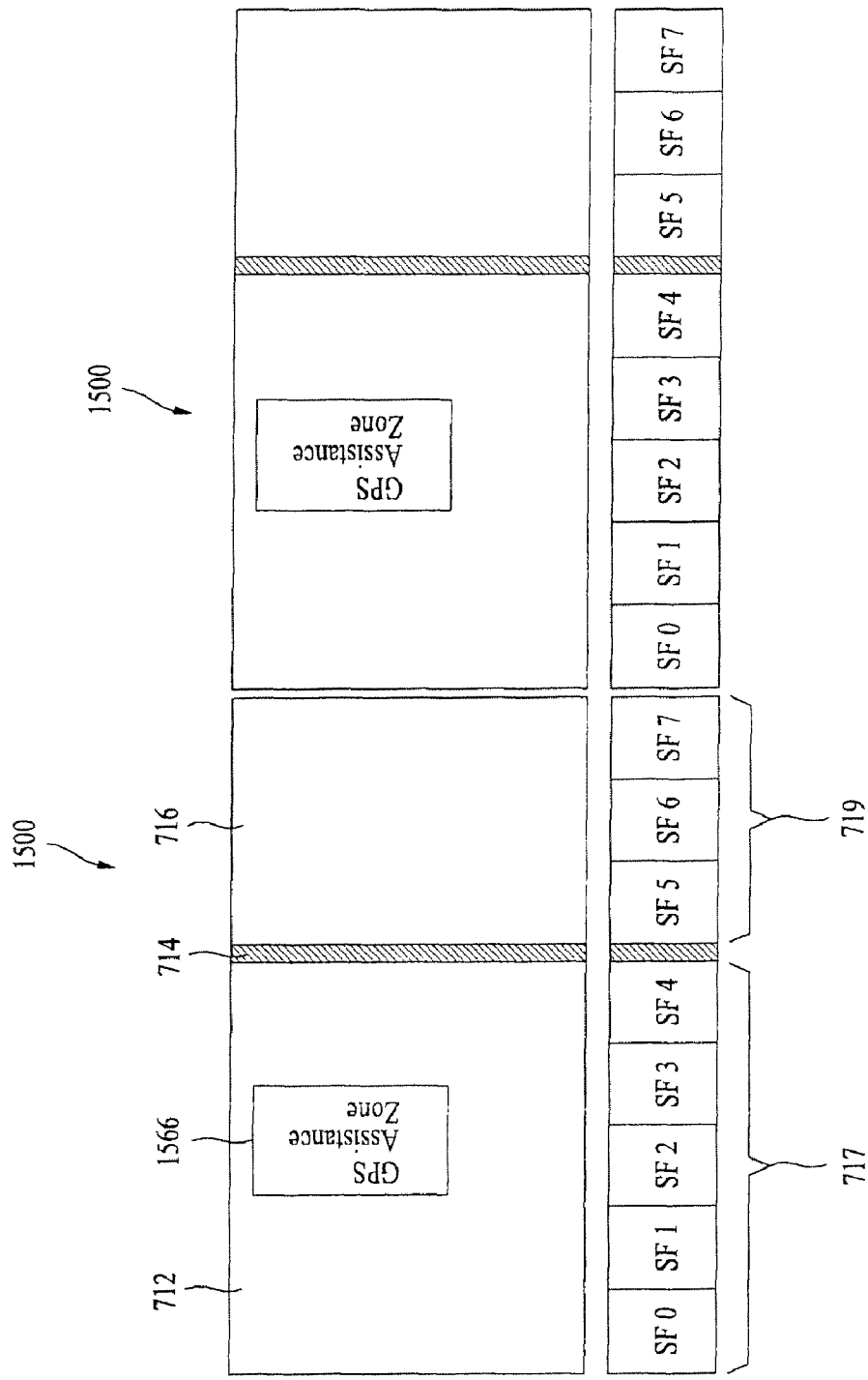
FIG. 15 depicts a BTS communication frame in accordance with another alternative embodiment of the present invention.

FIG. 15 depicts a BTS communication frame in accordance with another alternative embodiment of the present invention. In this figure, frame 1500 is shown with GPS assistance zone 1566 located within the DL zone 712. During the GPS assistance zone 1566, GPS assistance data can be transmitted to the one or more MSs from one or more BTSs. Zone 1566 may occur during any one or more slot frames SF0-SF4. In addition, a single slot frame may be used, or two or more adjacent slot frames may be used. The GPS assistance data typically includes various data used for determining the position of the MS. For example, the GPS assistance data can include almanac and ephemeris data.

Almanac data often includes information and the status concerning satellites 1456a-1456d, such as their locations. Since the almanac data may be spread over 25 data frames of a complete message transmitted from a GPS satellite, a period of 12.5 minutes may be required to receive the entire almanac from a single GPS satellite.

The ephemeris data includes orbital information for enabling calculation of the position of each GPS satellite. The ephemeris data is sent in each data frame of a complete message transmitted from a GPS satellite, and therefore, a period of 30 seconds may be required to receive the ephemeris data.

In one embodiment, MS 105 or similar device can receive the almanac and/or ephemeris data broadcasted by BTS during GPS assistance zone 1566. For example, if the N-GPS system of FIG. 14 is implemented using a WiMAX network, a message indicating whether the LBS zone or GPS assistance zone service is being requested or provided for a connection that is being setup can be represented in TLV parameters. An example of suitable TLV parameters is set forth in Table 4 below.

TABLE 4

| Type | Length | Value | Comment |
|------|--------|-------|---------|
| XXX | 1 | 0: No available LBS Zone.<br>1: LBS Zone in Serving BS only<br>2: LBS Zone in a multiple BS zone | |

As shown in Table 4, a value of "1" indicates that a multi-cast broadcast service (MBS) limited to the serving base station is being requested, and a value of "2" indicates that a multi-base station MBS is being requested.

In one embodiment, if the MS or a BTS wants to initiate an MBS service, a dynamic service add request (DSA-REQ) with an MBS service TLV can be used. The dynamic service add response (DSA-RSP) message can contain the acceptance or rejection of the request. If no LBS is available, then the LBS service value can be set to "0."

An exemplary TLV of data provided in the GS assistance zone 1566 is shown in Table 5.

TABLE 5

| Name | Type | Length (Byte) | Value |
|---|---|---|---|
| GPS Almanac TLV | XXX | Variable | GPS Almanac Data |
| Field Bit-Map | XXX.0 | 2 | It signaling which field of GPS Almanac is available. |
| GPS Satellite ID | XXX.1 | 1 | PRN of the SVN, Range: 0 to 32; Accuracy: I |
| Satellite Health | XXX.2 | 1 | 000 = usable; Range: 0 to 63; Accuracy: None |
| Eccentricity | XXX.3 | 3 | This shows the amount of the orbit deviation from circular (orbit). It is the distance between the foci divided by the length of the semi-major axis (our orbits are very circular). Range: 0.0 to 0.03; Accuracy: 4.7E−7 |
| Time of Applicability (s) | XXX.4 | 3 | The number of seconds in the orbit when the almanac was generated. Kind of a time tag. Range: 0 to 602112; Accuracy: 1 |
| Orbital Inclination (rad) | XXX.5 | 3 | The angle to which the SV orbit meets the equator (GPS is at approx. 55 degrees). Roughly, the SV's orbit will not rise above approx. 55 degrees latitude. The number is part of an equation: # = pi/180 = the true inclination Range: −9.999999E−2 to +9.999999E−2; Accuracy: 1.91E−6 |
| Rate of Right Ascen (r/s) | XXX.6 | 4 | Rate of change in the measurement of the angle of right ascension as defined in the Right Ascension mnemonic. Range: −9.999999E−7 to +9.999999E−7; Accuracy: 3.6E−12 |
| SQRT(A) (m1/2) | XXX.7 | 2 | This is defined as the measurement from the center of the orbit to either the point of apogee or the point of perigee. Range: 79.0 to 9999.99999; Accuracy: 4.8E−4 |
| Right Ascen at Week(rad) | XXX.8 | 3 | Geographic Longitude of the Ascending Node of the Orbit Plane at the Weekly Epoch Range: −9.999999E−7 to +9.999999E−7; Accuracy: 3.6E−12 |
| Argument of Perigee(rad) | XXX.9 | 3 | An angular measurement along the orbital path measured from the ascending node to the point of perigee, measured in the direction of the SV's motion. Range: −1.0 to +1.0; Accuracy: I.IE−7 |
| Mean Anom(rad) | XXX.10 | 3 | Angle (arc) traveled past the longitude of ascending node (value = 0-180 degrees or 0-negative 180 degrees). If the value exceeds 180 degrees, subtract 360 degrees to find the mean anomaly. When the SV has passed perigee and heading towards apogee, the mean anomaly is positive. After the point of apogee, the mean anomaly value will be negative to the point of perigee. Range: −1.0 to +1.0; Accuracy: 1.1E−7 |
| Af0(s) | XXX.11 | 3 | SV clock bias in seconds Range: −9.9999E−4 to +9.9999E−4; Accuracy: 9.5E−7 |
| Af1(s/s) | XXX.12 | 3 | SV clock Drift in seconds per seconds Range: −9.9999E−9 to +9.9999E−9; Accuracy: 3.6E−12 |
| GPS Week Number: | XXX.13 | 2 | GPS week (0000-1024), every 7 days since 22 Aug 1999 Range: 0 to 1023; Accuracy: 1 |
| Reserved | XXX.14-XXX.16 | N/A | N/A |

The "Field Bit-Map" field can be included to provide a mechanism for delivering only necessary almanac data fields. The length of the "Field Bit-Map" field is 2 bytes and 16 bits and each bit is mapped to each almanac data field. For example, the 13th most significant bit (MSB) of the "Field Bit-Map" field is mapped to XXX.13, that is, the "GPS Week Number." If the "Field Bit-Map" bit field is "0," then the "Field Bit-Map" is not included, whereas if the "Field Bit-Map" bit field is "1," the "Field Bit-Map" is included in the delivery.

Figure 16:
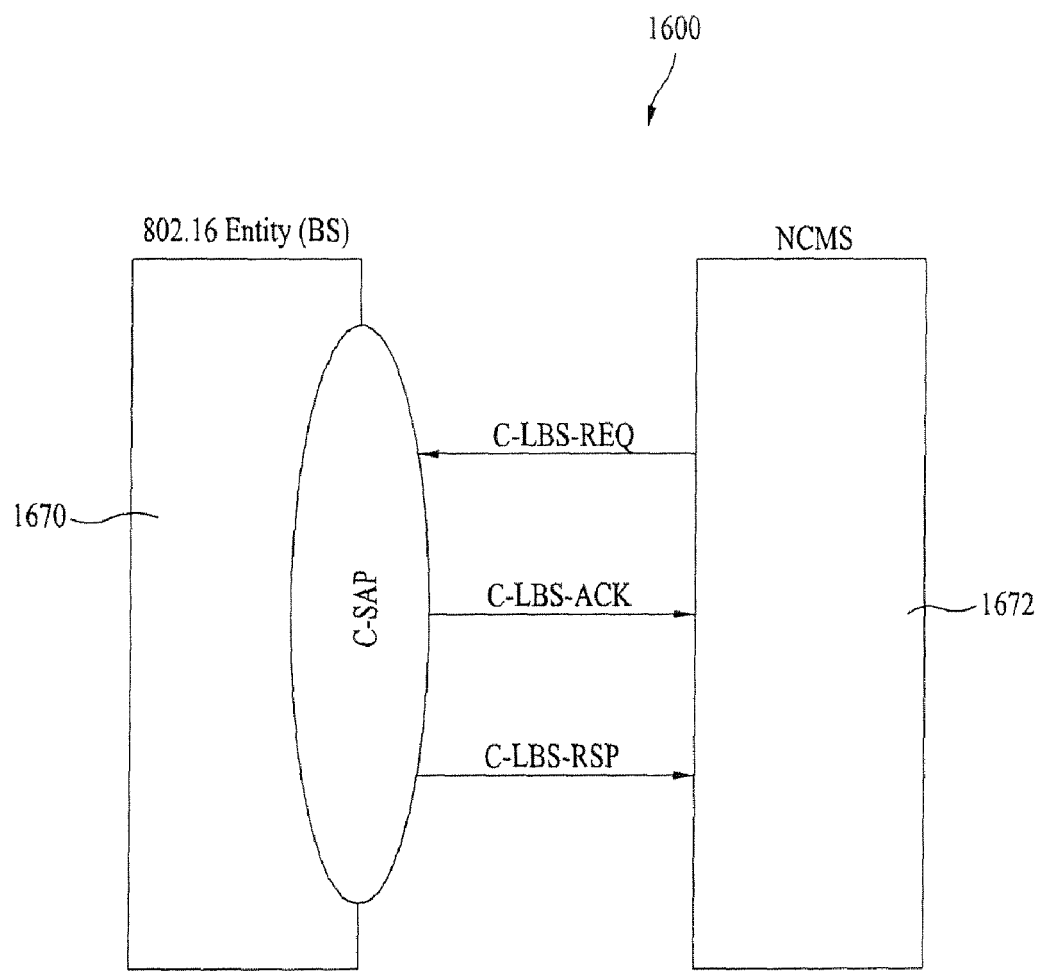
FIG. 16 shows an exemplary signal flow of location based service (LBS) management primitives between a base station and a network control and management system (NCMS) in accordance with one embodiment of the present invention.

FIG. 16 shows an exemplary signal flow of location based service (LBS) management primitives between a base station and a network control and management system (NCMS) in accordance with one embodiment of the present invention. An example of the parameters of the control location based service request (C-LBS-REQ) are shown below in Table 6.

TABLE 6

| Parameter | Value |
|---|---|
| Operation_Type: | Get |
| Destination: | BS |
| Attribute_List: | MS MAC Address LBS Parameter Types |

An example of the parameters of the control location based service response (C-LBS-RSP) are shown below in Table 7. The GPS Assistance Data may include almanac data, ephemeris data, or other assisting data.

TABLE 7

| Parameter | Value |
| --- | --- |
| Operation_Type: | Get |
| Destination: | NCMS |
| Attribute_List: | MS MAC Address |
| | Requested LBS Parameters [BSID, |
| | CINR mean, RSSI mean, D-TDOA, |
| | U-TDOA, GPS assistance data] |

For example, the GPS information can be any of a precise GPS satellite orbit and clock information, an initial position and time estimate, a satellite selection, range information, and the like.

The precise GPS satellite orbit and clock information can include, for example, a reference time and a reference location. The initial position and time estimate can include, for example, an almanac, acquisition assistance, real-time integrity, and universal time co-ordinates. The satellite selection and range information can include, for example, differential GPS (DGPS) corrections, navigation model including the satellite ephemeris and clock corrections, ionospheric model, and UTC model.

In many large cities, such as New York or San Francisco, GPS receivers (e.g., those that are included in MS 105) may often times not have a clear line-of-sight view of at least four GPS satellites or successfully decode the GPS messages. As such, if a stand-alone GPS receiver can obtain some GPS messages before it starts decoding the received GPS signal, the GPS messages will assist to successfully establish the first fix or shorten the time to first fix (TTFF).

An additional assistant GPS server is usually provided by the network. However, the additional assistant GPS server requires a GPS receiver having a good data connection to the GPS server before downloading assisting information.

When located indoors, a mobile station may not be able to decode a GPS signal, even though it has GPS receiver. Moreover, it may be difficult for the mobile station to successfully decode or observe the pilot signal broadcasted by nearby base station, when the mobile station is located indoors.

In one embodiment, a relay station located within a suitable distance of the mobile station can broadcast or unicast its known GPS message or assisting data to allow the mobile station to receive the GPS message or assisting data when reception conditions are poor. Typically, the relay station is configured to have certain GPS or location knowledge. For example, the relay station can be mobile, a repeater or any type of transmitter that can broadcast or unicast information. The air-interface used by the relay station can be, for example, a WiMAX air interface, Bluetooth™, IS2000, W-CDMA, or any of the other interfaces disclosed herein.

Transmissions by the relay station can include the position of the relay station, the GPS messages decoded by the relay station, the timing or id information of each observed pilot by the relay station, or the position information received or known by the relay station. For example, the position information received or known by the relay station can include a nearby base station positioning information, nearby base station cell Id or network Id. For example, the GPS information can be any of precise GPS satellite orbit and clock information, initial position and time estimate, or satellite selection and range information.

The precise GPS satellite orbit and clock information can include, for example, a reference time and a reference location. The initial position and time estimate can include, for example, an almanac, acquisition assistance, real-time integrity, and universal time co-ordinates. The satellite selection and range information can include, for example, differential GPS (DGPS) corrections, navigation model (contains satellite ephemeris and clock corrections), ionospheric model, and UTC model.

In one embodiment, a mobile station located in a poor positioning environment can send an access signal for possible connection. This access information signal can be existing legacy access signal or a special defined access signal. For example, a connected relay station will, if possible, try to determine the positioning of the mobile station based on either the position information data of the relay or the signal characteristics measured from the signal sent by the mobile station. The positioning technique used to determine the location of the mobile station can be, for example, cell Id, time of arrival, time different of arrival, direction of arrival, signal strength, or observed round trip time.

If the relay station has some information concerning the mobile station, the relay station will provide the information to the mobile station. If necessary, the relay station will also reply or broadcast its known positioning data to the mobile station to assist the mobile station to determine the position of the mobile station by itself. The content of the information depends on the request from the mobile station.

In one embodiment, a relay station may periodically broadcast positioning data of the relay station for positioning-assisting data, the relay station's own positioning data, the nearby base station information known by the relay station, and the GPS information known by this relay station. For example, a mobile station broadcasts a positioning-request signal. At least one nearby relay station received this request and replies back with the position of the nearby relay station. If there is only one relay station, the mobile station may take the position of the relay station as an approximation of the position of the mobile station. If multiple relay stations report their positions, the mobile station can perform a spatial average of received position data from the multiple relay stations to generate an approximation of the position of the mobile station. The multiple relay stations will each transmit a positioning message including position data in a coordinated manner, and mobile station will be able to measure the positioning data for positioning.

As another example, nearby mobile stations can help the LBS-requesting mobile station by sending the location information of other nearby mobile stations to the LBS-requesting mobile station. The base station will request other nearby mobile stations equipped with GPS receivers and that are within the same sector to broadcast the location information corresponding to the other nearby mobile stations. The other nearby mobile stations reply to the base station, and the base station will schedule the time burst for mobile station.

Therefore, the orbital description data of GPS satellites is useful for a mobile station having a GPS receiver to perform GPS positioning. In addition, the almanac data is generally usable for months. By making the almanac data easily available to mobile stations from the network, the existing support of LBS can be enhanced.

The delivery of GPS orbital description data, such as the almanac and ephemeris, to mobile stations can be realized by the implementation of the GPS assistance zone and the GPS TLV. As discussed above, the GPS assistance zone is a special broadcast zone for broadcasting GPS orbital description data. The GPS TLV, including GPS almanac TLV and ephemeris TLV, is another mechanism to assist the mobile station to perform GPS positioning. The GPS assistance zone also enables LBS management by allowing a mobile station to request GPS assistance data for LBS.

Therefore, as shown in the comparison of features of the GPS, N-GPS, and A-GPS networks shown in Table 8, using a broadcast message to deliver the GPS assistance data during a GPS assisting zone can provide greater efficiency.

TABLE 8

| Feature | GPS | N-GPS | A-GPS |
|---|---|---|---|
| Accuracy | Good | Better | Best |
| Yield | Good | Better | Best |
| TTFF | Slow | Fast | Faster |
| Additional Carrier Investment | None | None | Yes. |
| Protocols | Open | Open | Propriety |
| Access to Network | No Control Channel Access | Control Channel Access Only | Control Channel Access |
| | No Traffic Channel Access | No Traffic Channel Access | Traffic Channel Access |

Figure 17:
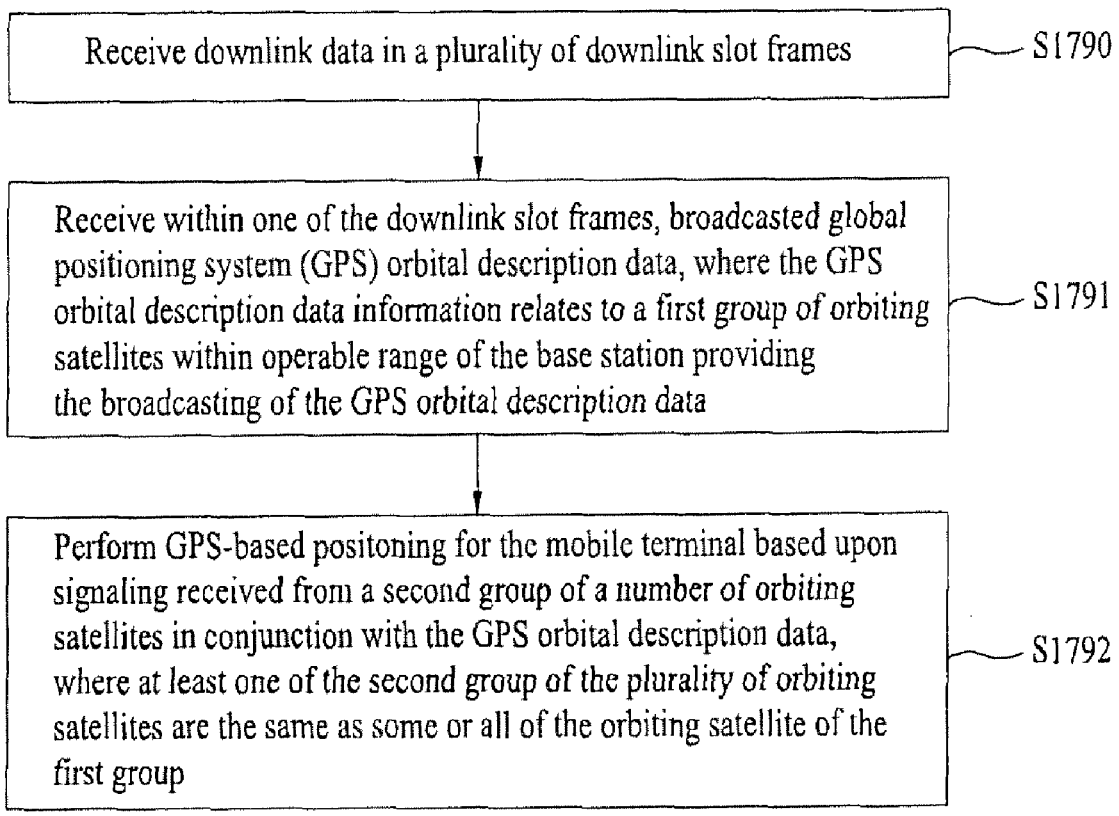
FIG. 17 is a flow chart of a method for acquiring positioning information according to an exemplary embodiment of the present invention.

FIG. 17 is a flow chart of a method for acquiring positioning information according to an exemplary embodiment of the present invention. As shown in FIG. 17, an MS receives downlink data in a plurality of downlink slot frames (S1790). The MS then receives within one of the downlink slot frames, broadcasted GPS orbital description data, where the GPS orbital description data information relates to a first group of orbiting satellites within operable range of the BS providing the broadcasting of the GPS orbital description data (S1791).

The MS then performs GPS-based positioning based upon signaling received from a second group of a number of orbiting satellites in conjunction with the GPS orbital description data, where at least one of the second group of the plurality of orbiting satellites are the same as some or all of the orbiting satellites of the first group (S1792).

Figure 18:
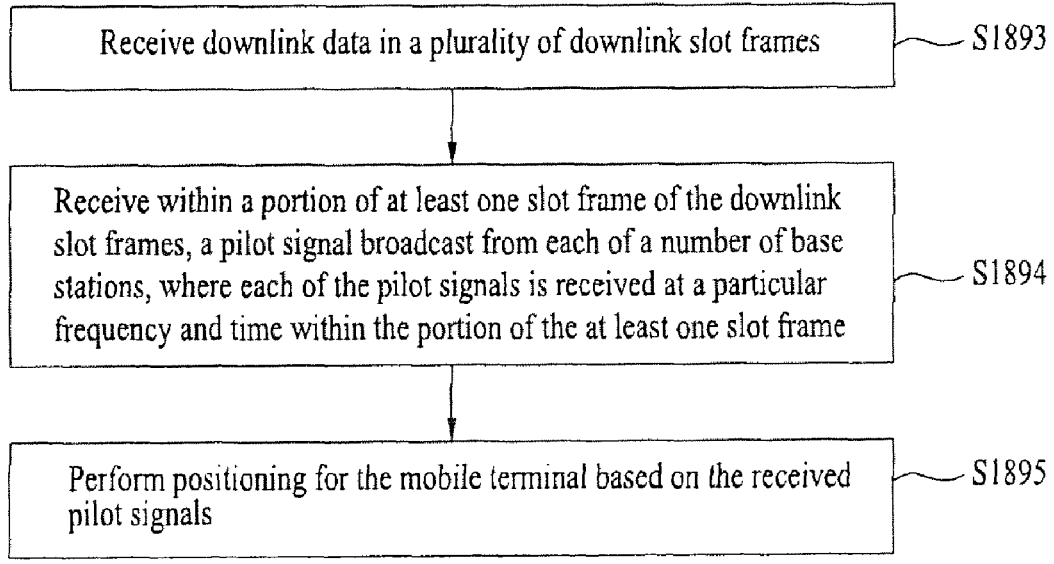
FIG. 18 is a flow chart of a method for facilitating positioning according to another exemplary embodiment of the present invention.

FIG. 18 is a flow chart of a method for facilitating positioning according to another exemplary embodiment of the present invention. In this figure, an MS receives downlink data in a plurality of downlink slot frames (S1893). The MS then receives within a portion of at least one slot frame of the downlink slot frames, a pilot signal broadcast from each of a number of base stations, where each of the pilot signals is received at a particular frequency and time within the portion of the at least one slot frame (S1894). If desired, the MS then performs positioning based on the received pilot signals (S1895).

Figure 19:
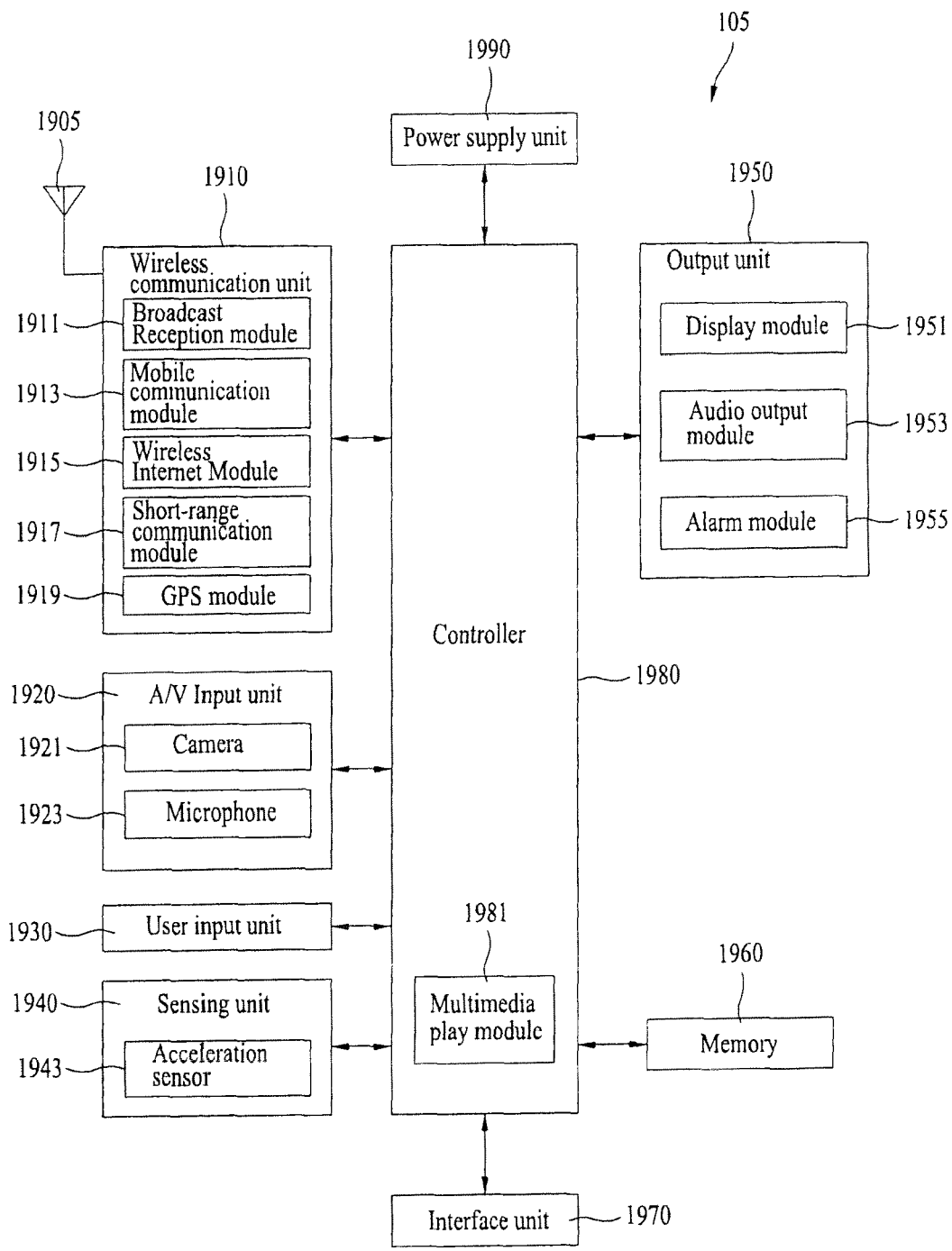
FIG. 19 is a block diagram showing in more detail various components which may be implemented in a mobile station according to various embodiment of the present invention.

FIG. 19 is a block diagram showing in more detail various components which may be implemented in MS 105 according to various embodiment of the present invention. It is understood that greater or fewer components than those shown may be implemented.

Referring to FIG. 19, the MS 105 may include a wireless communication unit 1910, an audio/video (A/V) input unit 1920, a user input unit 1930, a sensing unit 1940, an output unit 1950, a memory 1960, an interface unit 1970, a controller 1980, and a power supply unit 1990. Two or more of the wireless communication unit 1910, the A/V input unit 1920, the user input unit 1930, the sensing unit 1940, the output unit 1950, the memory 1960, the interface unit 1970, the controller 1980, and the power supply unit 1990 may be incorporated into a single unit, or some of the wireless communication unit 1910, the A/V input unit 1920, the user input unit 1930, the sensing unit 1940, the output unit 1950, the memory 1960, the interface unit 1970, the controller 1980, and the power supply unit 1990 may be divided into two or more smaller units.

The wireless communication unit 1910 may include a broadcast reception module 1911, a mobile communication module 1913, a wireless Internet module 1915, a short-range communication module 1917, and a GPS module 1919.

The broadcast reception module 1911 receives a broadcast signal and/or broadcast-related information from an external broadcast management server through a broadcast channel. Examples of a broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of broadcast-related information include broadcast channel information, broadcast program information, and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to MS 105 through a mobile communication network. In this case, the broadcast-related information may be received by the mobile communication module 1913, rather than by the broadcast reception module 1911. The broadcast-related information may come in various forms, for example, electronic program guide (EPG) of digital multimedia broadcasting (DMB) or electronic service guide (ESG) of digital video broadcast-handheld (DVB-H).

Broadcast reception module 1911 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 1911 may be configured to be suitable for nearly all types of broadcasting systems other than those set forth herein.

The broadcast signal and/or the broadcast-related information received by the broadcast reception module 1911 may be stored in memory 1960.

The mobile communication module 1913 transmits wireless signals to or receives wireless signals from at least one or more of a base station, an external station, and a server through a mobile communication network. The wireless signals may include various types of data according to whether the MS 105 transmits/receives voice call signals, video call signals, or text/multimedia messages.

The wireless Internet module 1915 may be a module for wirelessly accessing the Internet. The wireless Internet module 1915 may be embedded in the MS 105 or may be installed in an external device.

The short-range communication module 1917 may be a module for short-range communication. The short-range communication module 1917 may use various short-range communication techniques such as Bluetooth®, radio frequency identification (RFID), infrared data association (IrDA), ultra wideband (UWB), and ZigBee®.

The GPS module 1919 may receive position information from one or more satellites (e.g., GPS satellites).

The A/V input unit 1920 may be used to receive audio signals or video signals. The A/V input unit 1920 may include one or more cameras 1921 and a microphone 1923. The camera 1921 processes various image frames such as still images or moving images captured by an image sensor during a video call mode or an image capturing mode. The image frames processed by the camera 1921 may be displayed by a display module 1951.

The image frames processed by the camera 1921 may be stored in the memory 1960 or may be transmitted outside the MS 105 through the wireless communication unit 1910. The MS 105 may include more than two cameras.

The microphone 1923 receives external sound signals during a call mode, a recording mode, or a voice recognition mode with the use of a microphone and converts the sound signals into electrical sound data. In the call mode, the mobile communication module 1913 may convert the electrical sound data into data that can be readily transmitted to a mobile communication base station and then output the data obtained by the conversion. The microphone 1923 may use various noise removal algorithms to remove noise that may be generated during the reception of external sound signals.

The user input unit 1930 generates key input data based on user input for controlling the operation of the MS 105. The user input unit 1930 may be implemented as a keypad, a dome switch, a touch pad (either static pressure or constant electricity), a jog wheel, or a jog switch. In particular, if the user input unit 1930 is implemented as a touch pad and forms a mutual layer structure along with the display module 1951, the user input unit 1930 and the display module 1951 may be collectively referred to as a touch screen.

The sensing unit 1940 determines a current state of the MS 105 such as whether the MS 105 is opened or closed, the position of the MS 105 and whether the MS 105 is placed in contact with a user. In addition, the sensing unit 1940 generates a sensing signal for controlling the operation of the MS 105.

For example, when the MS 105 is a slider-type mobile phone, the sensing unit 1940 may determine whether the MS 105 is opened or closed. In addition, the sensing unit 1940 may determine whether the MS 105 is powered by the power supply unit 1990 and whether the interface unit 1970 is connected to an external device.

The sensing unit 1940 may include an acceleration sensor 1943. Acceleration sensors are a type of device for converting an acceleration variation into an electric signal. With recent developments in micro-electromechanical system (MEMS) technology, acceleration sensors have been widely used in various products for various purposes. For example, an acceleration sensor may be used as an input device for a computer game and may sense the motion of the human hand during a computer game.

Two or three acceleration sensors 1943 representing different axial directions may be installed in the MS 105. Alternatively, only one acceleration sensor 1943 representing a Z axis may be installed in the MS 105.

The output unit 1950 may output audio signals, video signals, and alarm signals. The output unit 1950 may include the display module 1951, an audio output module 1953, and an alarm module 1955.

The display module 1951 may display various information processed by the MS 105. For example, if the MS 105 is in a call mode, the display module 1951 may display a user interface (UI) or a graphical user interface (GUI) for making or receiving a call. If the MS 105 is in a video call mode or an image capturing mode, the display module 1951 may display a UI or a GUI for capturing or receiving images.

If the display module 1951 and the user input unit 1930 form a mutual layer structure and are thus implemented as a touch screen, the display module 1951 may be used not only as an output device but also as an input device. If the display module 1951 is implemented as a touch screen, the display module 1951 may also include a touch screen panel and a touch screen panel controller.

The touch screen panel is a transparent panel attached onto the exterior of the MS 105 and may be connected to an internal bus of the MS 105. The touch screen panel monitors whether the touch screen panel is touched by a user. Once a touch input to the touch screen panel is detected, the touch screen panel transmits a number of signals corresponding to the touch input to the touch screen panel controller.

The touch screen panel controller processes the signals transmitted by the touch screen panel and transmits the processed signals to the control unit 1980. The control unit 1980 then determines whether a touch input has been generated and which part of the touch screen panel has been touched based on the processed signals transmitted by the touch screen panel controller.

As described above, if the display module 1951 and the user input unit 1930 form a mutual layer structure and are thus implemented as a touch screen, the display module 1951 may be used not only as an output device but also as an input device. The display module 1951 may include at least one of a liquid crystal display (LCD), a thin film transistor (TFT)-LCD, an organic light-emitting diode (OLED), a flexible display, and a three-dimensional (3D) display.

The MS 105 may include two or more display modules 1951. For example, the MS 105 may include an external display module and an internal display module.

The audio output module 1953 may output audio data received by the wireless communication unit 1910 during a call reception mode, a call mode, a recording mode, a voice recognition mode, or a broadcast reception mode or may output audio data present in the memory 1960. In addition, the audio output module 1953 may output various sound signals associated with the functions of the MS 105 such as receiving a call or a message. The audio output module 1953 may include a speaker and a buzzer.

The alarm module 1955 may output an alarm signal indicating the occurrence of an event in the MS 105. Examples of the event include receiving a call signal, receiving a message, and receiving a key signal. Examples of the alarm signal output by the alarm module 1955 include an audio signal, a video signal, and a vibration signal.

The alarm module 1955 may output a vibration signal upon receiving a call signal or a message. In addition, the alarm module 1955 may receive a key signal and may output a vibration signal as feedback to the key signal.

Once a vibration signal is output by the alarm module 1955, the user may recognize that an event has occurred. A signal for notifying the user of the occurrence of an event may be output by the display module 1951 or the audio output module 1953.

The memory 1960 may store various programs necessary for the operation of the controller 1980. In addition, the memory 1960 may temporarily store various data such as a phonebook, messages, still images, or moving images.

The memory 1960 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The MS 105 may operate a web storage, which performs the functions of the memory 1960 on the Internet.

The interface unit 1970 may interface with an external device that can be connected to the MS 105. The interface unit 1970 may be a wired/wireless headset, an external battery charger, a wired/wireless data port, a card socket such as for a memory card or a subscriber identification module (SIM)/ user identity module (UIM) card, an audio input/output (I/O) terminal, a video I/O terminal, or an earphone.

The interface unit 1970 may receive data from an external device or may be powered by an external device. The interface unit 1970 may transmit data provided by an external device to other components in the MS 105 or may transmit data provided by other components in the MS 105 to an external device.

The controller 1980 may control the general operation of the MS 105. For example, the controller 1980 may perform various control operations regarding making/receiving a voice call, transmitting/receiving data, or making/receiving a video call.

The controller 1980 may include a multimedia play module 1981, which plays multimedia data. The multimedia play module 1981 may be implemented as a hardware device and may be installed in the controller 1980. Alternatively, the multimedia play module 1981 may be implemented as a software program.

The power supply unit 1990 is supplied with power by an external power source or an internal power source and supplies power to other components in the MS 105.

In alternative implementations, certain logic operations may be performed in a different order, modified or removed and still implement preferred embodiments of the present invention. Moreover, operations may be added to the above described logic and still conform to assorted implementations of the invention.

Furthermore, the described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may include a transmission media, such as a network transmission line, wireless transmission media, signals propagating through space, radio waves, infrared signals, etc. Of course, those skilled in the art will recognize that many modifications may be made to this configuration, and that the article of manufacture may comprise any information bearing medium known in the art.

The logic implementation shown in the figures describe specific operations as occurring in a particular order. In alternative implementations, certain logic operations may be performed in a different order, modified or removed and still implement certain embodiments of the present invention. Moreover, operations may be added to the above described logic and still conform to the described implementations.

The foregoing embodiments and advantages are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for acquiring data to facilitate positioning at a mobile station (MS), the method comprising:
   receiving location based service (LBS) zone information including a size and location of an LBS zone or an LBS pilot zone for performing a positioning operation of the MS, wherein the LBS zone information indicates that the LBS zone or the LBS pilot zone is located within a slot frame corresponding to a slot frame (SF) index of 2 or 3 in every frame of a frame structure between the MS and a plurality of base stations (BSs), wherein the frame includes a plurality of slot frames;
   receiving LBS pilot signals via the LBS zone from the plurality of BSs based on the LBS zone information;
   performing the positioning operation for the MS based on the received LBS pilot signals,
   wherein the LBS pilot signals are received via a set of different time periods or different frequency regions within the slot frame corresponding to the SF index of 2 or 3.

2. The method according to claim 1, wherein the LBS pilot signals are received as frequency division multiplexed in the LBS zone.

3. The method according to claim 1, wherein the LBS pilot signals are received as time division multiplexed in the LBS.

4. The method according to claim 1, wherein the LBS pilot signals are received as a hybrid type of frequency division multiplex (FDM) and time division multiplex (TDM) schemes in the LBS.

5. A method for acquiring data to facilitate positioning at a mobile station (MS), the method comprising:
   receiving, at the MS, location based service (LBS) zone information including a size and location of an LBS zone or an LBS pilot zone, wherein the LBS zone information indicates that the LBS zone or the LBS pilot zone is located within a frame comprising a plurality of portions that define at least indexes 0 to 4, wherein the LBS zone or the LBS pilot zone corresponding to an index of 2 or 3 of the frame in every frame of a frame structure between the MS and a plurality of base station (BSs);
   receiving, at the MS, LBS pilot signals via the LBS zone from the plurality of BSs based on the LBS zone information, wherein the LBS pilot signals are received via a set of different time periods or different frequency regions within a portion of the frame corresponding to the index of 2 or 3; and
   performing, at the MS, the positioning operation for the MS based on the received LBS pilot signals.

* * * * *